US006466731B2

(12) United States Patent
Aoki et al.

(10) Patent No.: US 6,466,731 B2
(45) Date of Patent: *Oct. 15, 2002

(54) MOVING PICTURE PROCESSING METHOD AND MOVING PICTURE PROCESSING APPARATUS

(75) Inventors: Hisashi Aoki, Kawasaki (JP); Toshimitsu Kaneko, Yokohama (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/832,374

(22) Filed: Apr. 2, 1997

(65) Prior Publication Data

US 2002/0071649 A1 Jun. 13, 2002

(30) Foreign Application Priority Data

Apr. 3, 1996 (JP) .............................. 8-081146

(51) Int. Cl.$^7$ ................................. H04N 5/91
(52) U.S. Cl. ......................... 386/46; 348/700
(58) Field of Search ................ 386/1, 45, 46, 386/125, 126, 4, 5, 34; 345/302, 327, 418; 348/700, 223; 725/19, 21

(56) References Cited

U.S. PATENT DOCUMENTS

| | | | | |
|---|---|---|---|---|
| 4,697,209 A | * | 9/1987 | Kiewit et al. ................. 725/19 |
| 5,099,322 A | * | 3/1992 | Gove ........................ 348/700 |
| 5,613,032 A | * | 3/1997 | Cruz et al. .................... 386/69 |
| 5,619,347 A | * | 4/1997 | Taniguchi et al. .......... 358/516 |
| 5,668,917 A | * | 9/1997 | Lewine ........................ 386/52 |
| 6,157,744 A | * | 12/2000 | Nagasaka et al. ........... 348/700 |

FOREIGN PATENT DOCUMENTS

| | | | |
|---|---|---|---|
| EP | 0473322 | * | 3/1992 |
| JP | 7-114567 | | 5/1995 |

OTHER PUBLICATIONS

Yoshinobu Tonomura, et al. "Structured Video Computing", IEEE Multimedia, (pp. 34–43), Fall, 1994.

Akio Nagasaka, et al. "Realtime Video Scene Detection Based on Shot Sequence Encoding", Trans. of Inst. of Elec. Info and Comm D–II, vol. J79–D–II, No. 4, (pp. 531–537), Apr. 25, 1996.

* cited by examiner

*Primary Examiner*—Andrew B. Christensen
*Assistant Examiner*—Christopher Onuaku
(74) *Attorney, Agent, or Firm*—Oblon, Spivak, McClelland, Maier & Neustadt, P.C.

(57) ABSTRACT

The object of the present invention is to provide a moving picture processing apparatus capable of preventing the viewer from watching the already watched pictures repeatedly. The moving picture processing apparatus of the present invention records the feature amounts of the already watched pictures in a database every moment and judges whether or not the pictures the viewer is now watching have already been displayed. When the current pictures are what have already been displayed, the apparatus carries out the process of stopping the video output until the time set by the user has been reached. When a list of small screens appears to show pictures, the apparatus carries out the process of displaying only dissimilar pictures on the screen.

51 Claims, 12 Drawing Sheets

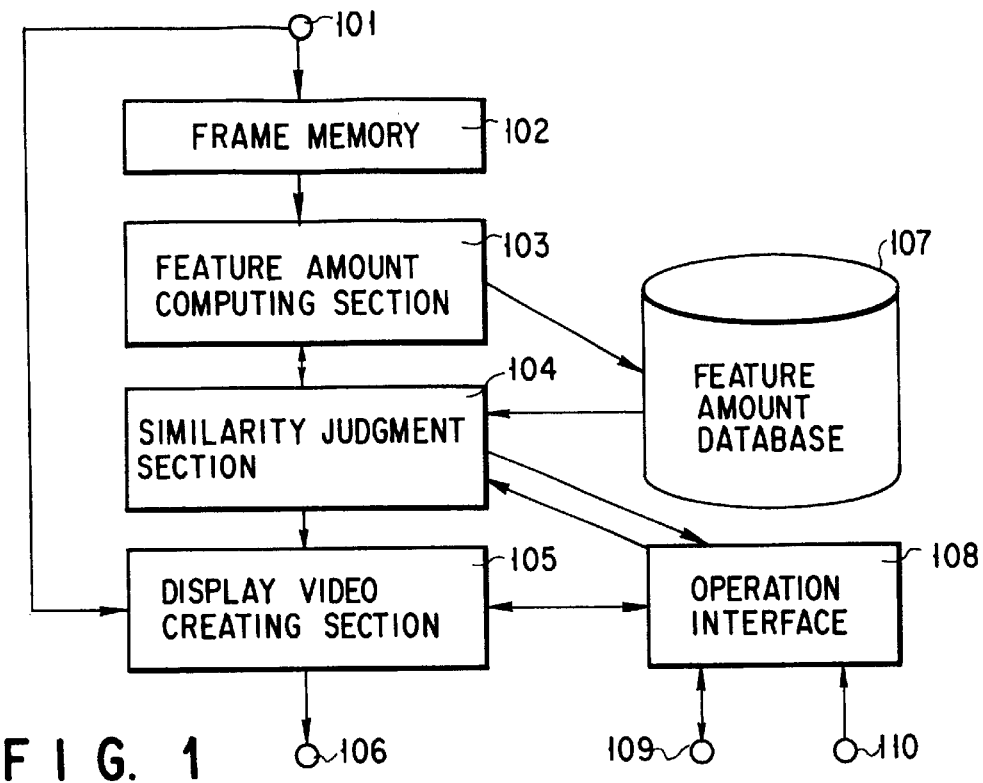
F I G. 1
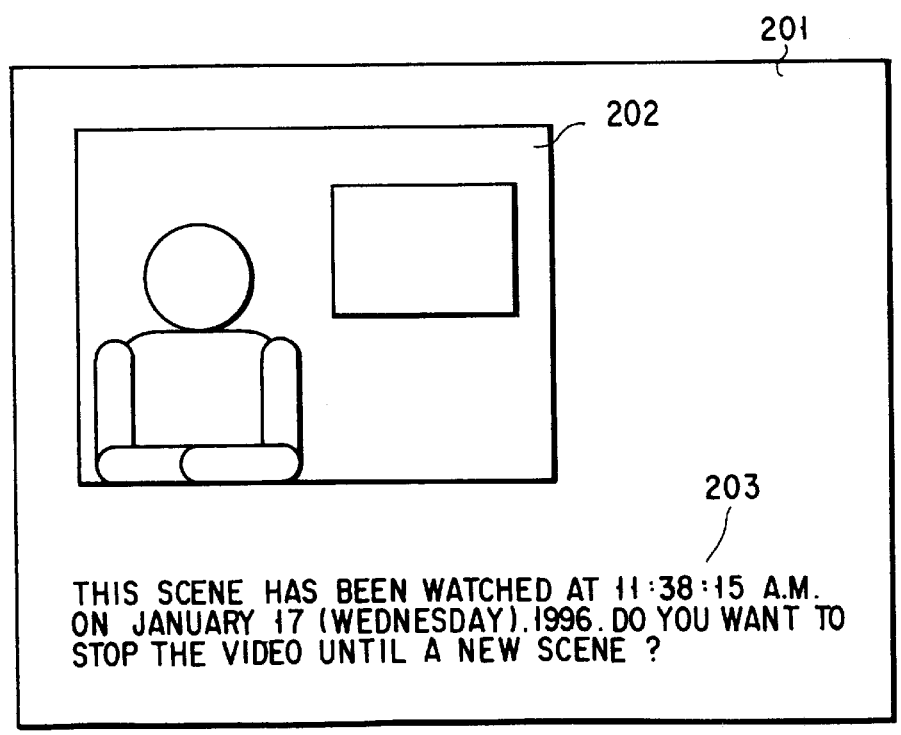
F I G. 2

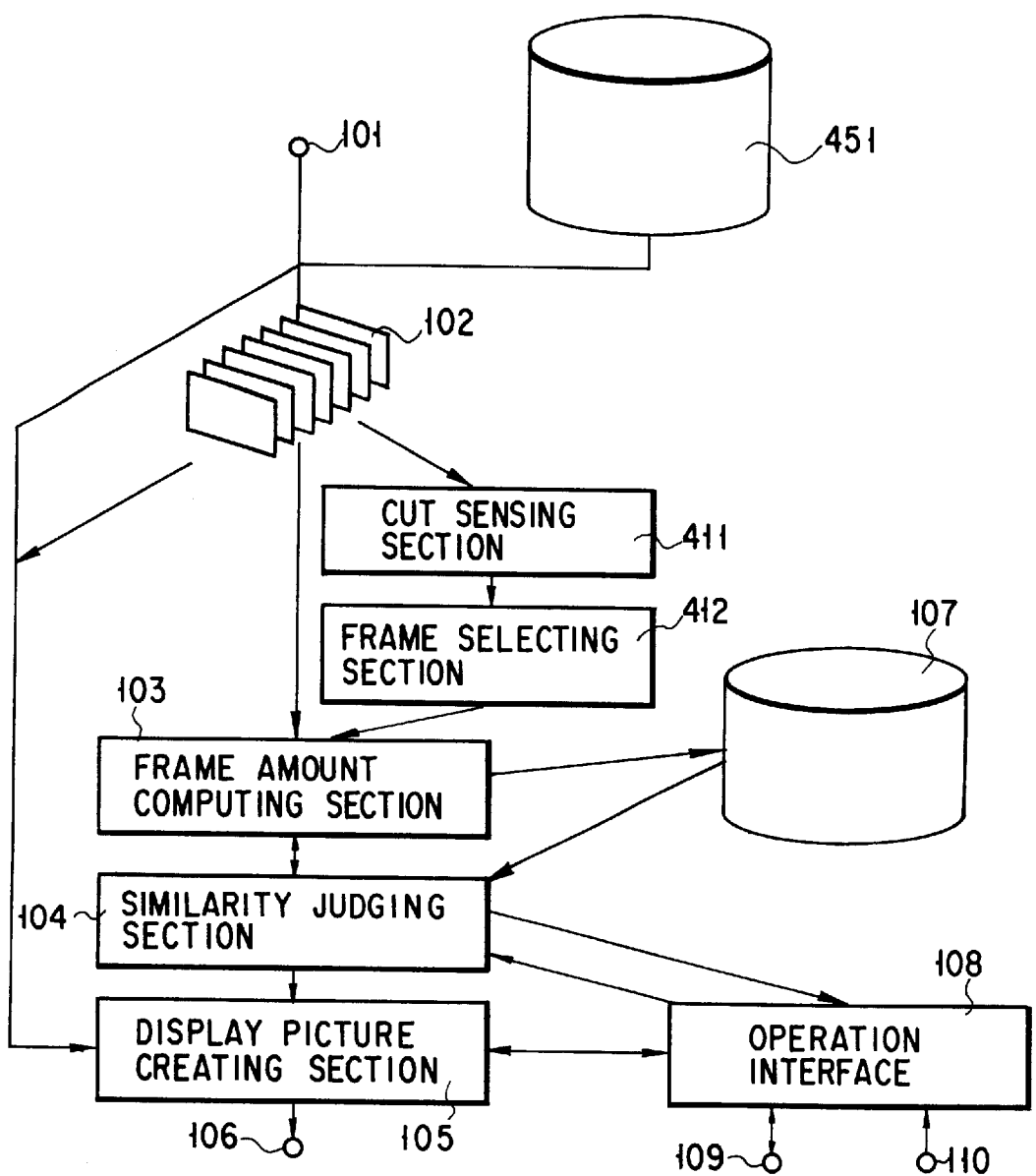
F I G. 14

MOVING PICTURE PROCESSING METHOD AND MOVING PICTURE PROCESSING APPARATUS

BACKGROUND OF THE INVENTION

This invention relates to a moving picture processing method and moving picture processing apparatus for editing multimedia information, particularly moving picture data.

As satellite broadcasting (BS broadcasting) and cable television broadcasting (CATV) have been popularized, the number of video channels that can be viewed in the home is steadily increasing. It is safe to say that an environment is being enriched in which ordinary users can access large numbers of pictures in the field of DVDs (digital versatile disks) that can record and reproduce video and audio information in the form of digital data, as well as in the fields of video recording mediums including conventional video tape and laser disks.

In contrast, the techniques for efficiently accessing the desired one of large numbers of pictures have not progressed. For example, viewers choose their desired pictures (programs), referring to the program column in the newspaper. In the case of consumers who want to buy video software packages, they choose their desired video packages, referring to the titles, cast, and plot written on the packages.

On the packages, the contents of pictures are described in letters in text form, but not all of the pictures are described. It goes without saying that describing all of the pictures in text form would take a lot of time and labor.

Furthermore, the desire to watch a particular part of the picture differs from user to user, so providing text descriptions intended for all users leads to an increase in the volume of additional information, which makes it difficult to put the approach to practical use, especially in the case of a source that has a limit to the amount of information to be supplied, such as broadcasting media.

Therefore, even when a viewer wants to watch only a particular topic in a news program, he or she has to wait for the desired topic to appear, leaving the television on, or is forced to repeatedly watch the news that the viewer has already watched in another program, resulting in a considerable waste of time.

The mainstream method of selecting the desired portion of the video information is a method of displaying pictures in such a manner that each changing point (a cut) of a scene is represented by a single small picture (icon) and allowing the user to choose the desired icon on the screen to tell the system the playback starting point or edit operation.

The method is based on the assumption that any part of the supplied video data can be accessed by request of the user (random access). It cannot be said that the method takes into account a case where information flows only in one direction as in broadcasting media.

When a system is used which processes pictures in a manner that enables the user to access the pictures randomly, the user has to transfer and record the video information once in the system to watch the program now being broadcast, which impairs the convenience seriously.

Furthermore, with the method of displaying a scene of pictures in such a manner that each cut is expressed by a single icon, for example, if a cut is created at regular intervals of five seconds, 1440 small pictures will be displayed for two hours of pictures. When the small screens are displayed in list form, the legibility cannot be said to be high.

With such a poor video environment, even if an environment where the user can access a huge amount of video information comes into being in the near future, it will be impossible to enjoy the amount of information smoothly and there is a possibility that the number of users getting confused due to the overwhelming volume of information will increase.

Specifically, an effective method of filtering the information from noninteractive video media, such as broadcasting media, in real time has not been proposed.

Moreover, although the present techniques provide the evaluation of the similarity of two still pictures or of the similarity of a moving picture to a still picture, a concrete method of determining the similarity between two moving pictures has not been proposed.

Furthermore, in connection with displaying the contents of pictures in the form of a list of small pictures, a concrete method of reducing the number of small pictures to be displayed according to the contents of pictures has not been proposed.

BRIEF SUMMARY OF THE INVENTION

It is, accordingly, an object of the present invention to overcome the above disadvantages in the prior art by reducing the time for the user to have to continue watching the screen even when the user has accessed an image source that the user cannot always access randomly, by preventing the scenes except for the desired one from being displayed.

It is another object of the present invention to provide a method of determining the similarity between two moving pictures.

It is still another object of the present invention to provide a method of increasing the number of information to be displayed by information-filtering moving pictures on the basis of the determined similarity.

According to a first aspect of the present invention, there is provided a moving picture processing method comprising the steps of:

extracting first feature amount data that indicates a feature of a first frame of the inputted moving picture data;

judging on the basis of the first feature amount data and second feature amount data indicating a feature of a second frame of the moving picture inputted before the first frame whether or not the first frame is similar to the second frame; and creating first picture data for displaying a first picture corresponding to the first frame at least in a part of a second picture corresponding to the second frame, when it has been judged that the first frame is similar to the second frame.

According to a second aspect of the present invention, there is provided a moving picture processing method comprising the steps of:

extracting first feature amount data that indicates a feature of a first frame of the inputted moving picture data;

judging on the basis of the first feature amount data and second feature amount data indicating a feature of a second frame of the moving picture inputted before the first frame whether or not the first frame is similar to the second frame; and creating second picture data for displaying a preset still picture at least in a part of a second picture corresponding to the second frame, when it has been judged that the first frame is similar to the second frame.

According to a third aspect of the present invention, there is provided a moving picture processing method comprising the steps of:

extracting first feature amount data that indicates a feature of a first frame of the inputted moving picture data;

judging on the basis of the first feature amount data and second feature amount data indicating a feature of a second frame of the moving picture inputted before the first frame whether or not the first frame is similar to the second frame;

creating first picture data for displaying a preset still picture at least in a part of a second picture corresponding to the second frame, when it has been judged that the first frame is similar to the second frame;

judging whether or not the second picture corresponding to the second frame is a preset stop cancellation screen; and creating second picture data for displaying the second picture corresponding to the second frame, when it has been judged that the second picture corresponding to the second frame is a preset stop cancellation screen.

According to a fourth aspect of the present invention, there is provided a moving picture processing apparatus comprising:

extracting means for extracting first feature amount data that indicates a feature of a first frame of the inputted moving picture data;

judging means for judging on the basis of the first feature amount data and second feature amount data indicating a feature of a second frame of the moving picture inputted before the first frame whether or not the first frame is similar to the second frame; and first creating means for creating first picture data for displaying a first picture corresponding to the first frame at least in a part of a second picture corresponding to the second frame, when it has been judged that the first frame is similar to the second frame.

According to a fifth aspect of the present invention, there is provided a moving picture processing apparatus comprising:

extracting means for extracting first feature amount data that indicates a feature of a first frame of the inputted moving picture data;

judging means for judging on the basis of the first feature amount data and second feature amount data indicating a feature of a second frame of the moving picture inputted before the first frame whether or not the first frame is similar to the second frame; and first creating means for creating second picture data for displaying a preset still picture at least in a part of a second picture corresponding to the second frame, when it has been judged that the first frame is similar to the second frame.

According to a sixth aspect of the present invention, there is provided a moving picture processing apparatus comprising:

extracting means for extracting first feature amount data that indicates a feature of a first frame of the inputted moving picture data;

first judging means for judging on the basis of the first feature amount data and second feature amount data indicating a feature of a second frame of the moving picture inputted before the first frame whether or not the first frame is similar to the second frame;

first creating means for creating first picture data for displaying a preset still picture at least in a part of a second picture corresponding to the second frame, when it has been judged that the first frame is similar to the second frame;

second judging means for judging whether or not the second picture corresponding to the second frame is a preset stop cancellation screen; and second creating means for creating second picture data for displaying the second picture corresponding to the second frame, when it has been judged that the second picture corresponding to the second frame is a preset stop cancellation screen.

With the above invention, the feature amount data indicating the feature of a frame of the inputted moving pictures is extracted, and a judgment is made whether or not the frames are similar to each other, on the basis of the extracted feature amount data and the feature amount data indicating the feature of the frames inputted in the past. When it has been judged that they are similar, the frame of the inputted moving picture data is displayed in window form or a preset still screen is displayed.

According to a seventh aspect of the present invention, there is provided a moving picture processing method comprising the step of:

selecting a first frame having at least one frame of a first shot of the inputted moving picture data;

extracting first feature amount data that indicates a feature of the selected first frame; and judging on the basis of the first feature amount data and second feature amount data that indicates feature of a second frame having at least one frame of a second shot of the moving picture inputted before the first shot whether or not the first shot is similar to the second shot.

According to an eighth aspect of the present invention, there is provided a moving picture processing apparatus comprising:

selecting means for selecting a first frame having at least one frame of a first shot of the inputted moving picture data;

extracting means for extracting first feature amount data that indicates a feature of the selected first frame; and judging means for judging on the basis of the first feature amount data and second feature amount data that indicates a feature of a second frame having at least one frame of a second shot of the moving picture inputted before the first shot whether or not the first shot is similar to the second shot.

With the above invention, the feature amount data indicating the feature of a frame in a shot of the inputted moving pictures is extracted, and a judgment is made whether or not the shots are similar to each other, on the basis of the extracted feature amount data and the feature amount data indicating the feature of the frames in the shots inputted in the past. When it has been judged that they are similar, the shots of the inputted moving picture data are displayed at least in a part of the display screen.

According to a ninth aspect of the present invention, there is provided a moving picture processing method comprising the steps of:

selecting a first shot serving as a comparison reference from the inputted moving picture data;

selecting a second shot to be compared from the inputted moving picture data;

judging whether or not the first shot is similar to the second shot;

putting a first label on the second shot, when it has been judged that the first shot is not similar to the second shot;

judging whether or not the second shot is a preset shot; and creating picture data for displaying a screen corresponding to one frame selected from the second shot with the first label at least in a part of a display screen, when it has been judged that the second shot is a preset shot.

According to a tenth aspect of the present invention, there is provided a moving picture processing method comprising:

a first step of selecting a first shot serving as a comparison reference from the inputted moving picture data;

a second step of selecting the shot next to the first shot as a second shot to be compared from the inputted moving picture data;

a third step of judging whether or not the first shot is similar to the second shot;

a fourth step of putting a first label on the second shot, when it has been judged that first shot is not similar to the second shot;

a sixth step of judging whether or not the second shot is a preset shot;

a fifth step of determining the shot next to the second shot to be a new second shot, when it has been judged that the second shot is not a preset shot, and then executing the third step to the fifth step repeatedly;

a seventh step of judging whether or not a specified number of shots have been made the first shot, when it has been judged that the second shot is a preset shot;

an eighth step of determining the shot next to the first shot to be a new first shot, when a specific number of shots have not been made the first shot, and then executing the third step to the seventh step repeatedly; and a ninth step of creating image data for displaying a screen corresponding to one frame selected from the second shot with the first label, when it has been judged that a specific number of shots have been made the first shot.

According to an eleventh aspect of the present invention, there is provided a moving picture processing apparatus comprising:

first selecting means for selecting a first shot serving as a comparison reference from the inputted moving picture data;

second selecting means for selecting a second shot to be compared from the inputted moving picture data;

first judging means for judging whether or not the first shot is similar to the second shot;

labeling means for putting a first label on the second shot, when it has been judged that first shot is not similar to the second shot;

second judging means for judging whether or not the second shot is a preset shot; and creating means for creating image data for displaying a screen corresponding to one frame selected from the second shot with the first label at least in a part of a display screen, when it has been judged that the second shot is a preset shot.

With the above invention, because a judgment is made whether or not the inputted shot is similar to a shot inputted in the past and only dissimilar shots are displayed, the amount of information displayed on the screen increases.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram of a moving picture processing apparatus according to a first embodiment of the present invention;

FIG. 2 illustrates a screen displayed on the basis of the picture data created by the display picture creating section;

FIG. 14 shows a moving picture processing apparatus according to a fourth embodiment of the present invention.

DETAILED DESCRIPTION OF THE INVENTION

Figure 3:
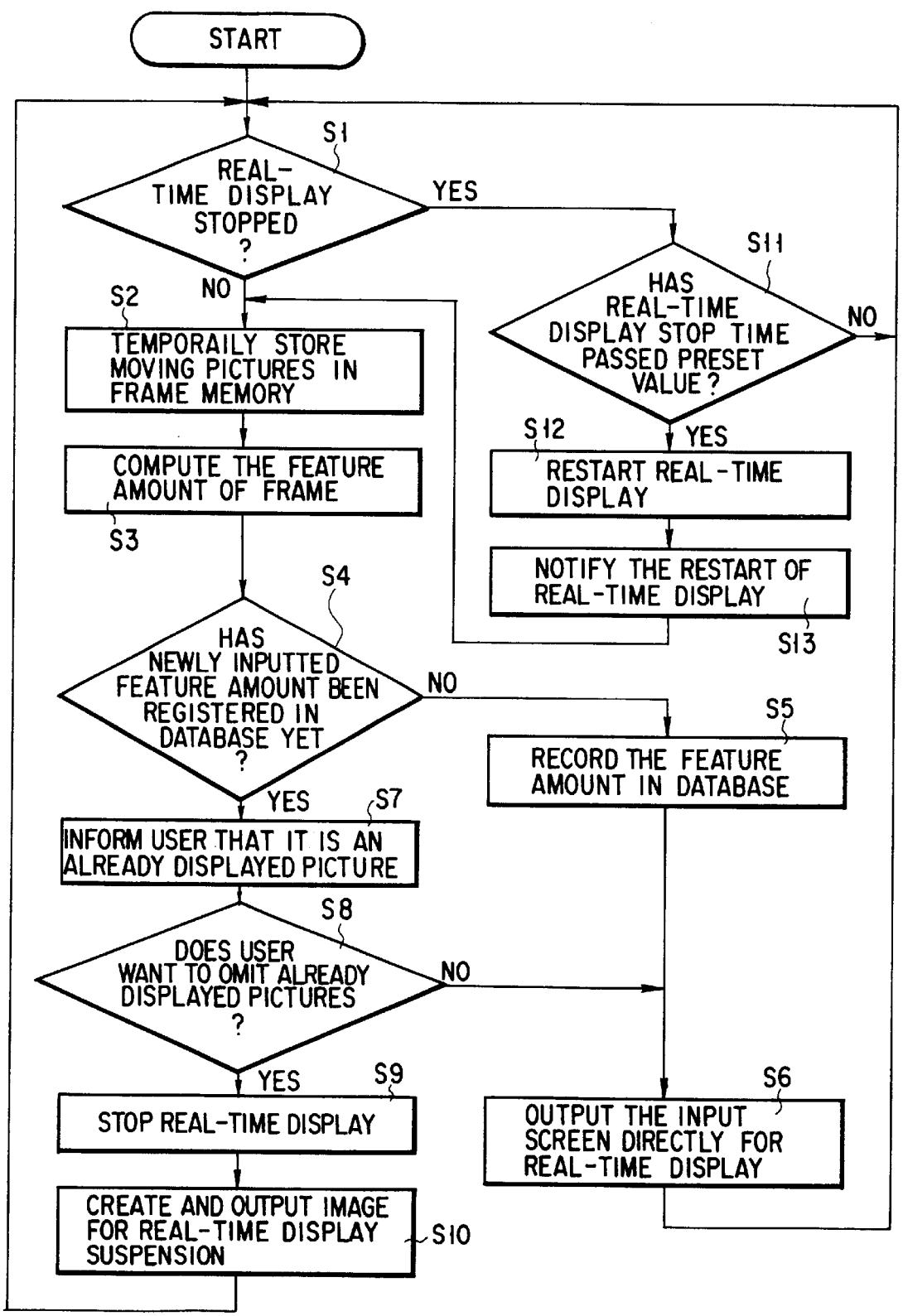
FIG. 3 is a flowchart of the operation of the moving picture processing apparatus according to the first embodiment of the present invention.

Hereinafter, referring to the accompanying drawings, embodiments of the present invention will be explained.

First Embodiment

With a moving picture processing method and moving picture processing apparatus according to a first embodiment of the present invention, the feature amount of video images is recorded in a database every moment and a check is always made to see if the current image is what has already been displayed via the apparatus. When the current image is what has already been displayed, the video images are prevented from being outputted until the time that the user has specified has been reached.

FIG. 1 is a block diagram of a moving picture processing apparatus according to the first embodiment of the present invention.

Explanation will be given, provided that the moving picture processing apparatus is placed between a tuner that receives television broadcasting (ground wave), satellite broadcasting (BS broadcasting), or cable television broadcasting (CATV), and a TV monitor that enables the user to watch the video received with the tuner.

The video and audio signal from the tuner is inputted to a video and audio input terminal 101. The video and audio signal reaches a display video creating section 105 and is sent to a frame memory 102.

The video and audio information normally undergoes no modification and is outputted to a video and audio output terminal 106, which enables the user to watch and listen the video and audio, being unaware of the existence of the moving picture processing apparatus.

For the video inputted to the frame memory 102, moving pictures that are changing every moment are converted at predetermined time intervals into digital still picture data that can be processed by a computer and the resulting still picture data is stored temporarily.

One of the temporarily stored still pictures is called one frame. The predetermined time interval is, for example, $\frac{1}{30}$ second or $\frac{1}{5}$ second. The time interval should be determined by the time that the following processes need for one frame.

The feature of one frame of picture data accumulated in the frame memory 102 is quantified by a feature amount computing section 103. The feature amount of a picture will be explained.

The simplest feature amount of a picture is picture data itself. For example, when the picture data is divided into 640×480 (length×breadth) rectangular regions and the three primary colors can be expressed in 256 gradations, the picture can be represented as a single point in a 640×480×3=921600 dimensional space. Since such a feature amount requires a lot of storage memory area and a long processing time, it is not appropriate to extract the feature amount directly from the inputted moving picture.

Another method of extracting the feature amount is a method of reducing the resolution of a picture and then extracting its feature amount.

For example, when the 640×480 picture is segmented into 40×30 picture regions and the average of the values of the three primary colors is determined to be the value of the pixel in each region, the amount of data on the feature amount can be reduced to one-256th.

When the value of each pixel is expressed by three values, luminance (Y), color difference between the luminance and red (Cr), and color difference between the luminance and blue (Cb) (the television signal is resolved into the three values) instead of dividing the value of each pixel into these three primary colors, the angle to a plane of Cr=0 with the axis of Cr=Cb=0 in the center is determined pixel by pixel in plotting the values of pixels in a YCrCb three-dimensional space. The angle is determined for each pixel in one frame. For example, the histogram (hue histogram) that represents the number of points plotted at intervals of an angle of 10 degrees is a 36-dimensional feature amount. This feature amount is a feature amount less liable to be affected by video effects, such as fade-out that dims down the picture gradually.

The feature amount whose amount of information is the smallest is the average of the luminance values of pictures or the like. The average has a one-dimensional value obtained by averaging the luminance value (Y value) of each pixel in one frame and takes a value of 0 for a deep-black screen and a value of 255 for a pure-white screen.

With the moving picture processing method of the present invention, there is no particular limit to a method of computing the feature amount.

The feature amount calculated at the feature amount computing section 103 is recorded in the feature amount database 107 when the inputted picture is new. In addition to the feature amount, the data recorded in the feature amount database 107 includes the date of the appearance of the frame and the video source information including which channel. When the name of the program now being broadcast is known in the form of digital data, it may be recorded as well.

The feature amount database 107 has stored all of the data items, including the feature amount of and the date of new pictures, and others, since the moving picture processing method of the present invention was used for the first time. In a case where the feature amount database 107 has a limitation to the memory capacity, when the limit of the memory capacity has been reached, a certain number of the stored pieces of information are deleted, starting with the oldest piece of information. The deletion may be specified by the user or may be requested in terms of period in such a manner that the deletion should be carried out after a specific number of days have elapsed since the recording of the pieces of information.

A judgment as to whether or not the feature amount of the inputted picture is new is made at a similarity judging section 104. The similarity judging section 104 compares the feature amount of the just inputted picture with each of the feature amounts of the already displayed pictures registered in the feature amount database 107 and reads out the feature amount of and the recording date of the picture whose feature amount is the closest to that of the just inputted picture.

To make the comparison easier, the pieces of information in the feature amount database 107 may be rearranged by feature amount beforehand. For example, in the case of the luminance value average, the values have been sorted in ascending order (or descending order) in advance.

The degree of agreement is determined by computing the distance between two feature amounts, that is, the feature amount regarding the just inputted picture and the feature amount concerning one picture present in the feature amount database 107. In an example of the feature amount using the above angle histogram, the distance between two feature amount points in a 36-dimensional space is obtained.

When the degree of agreement is high, that is, the distance is closer than the preset value, the inputted picture is judged to have already been displayed; otherwise, it is judged to have not been displayed.

When the similarity judging section 105 has judged that the inputted picture has not been displayed, that is, the inputted picture is new, the feature amount of the one frame and the additional information including the date are registered in the feature amount database 107. At this time, the video and audio information outputted from the video and audio output terminal 106 is the same as the one inputted from the video and audio input terminal 101.

When the similarity judging section 105 has judged that the inputted picture has already been displayed, the feature amount of the already displayed frame that has been compared and the related information are deleted from the feature amount database 107 and instead, the feature amount regarding the just inputted picture and the related information are registered newly.

At this time, the similarity judging section 104 sends to a display video creating section the notice that the present frame has already been displayed. The display video creating section 105 creates image data for displaying the notice that the present frame has already been displayed, on the screen that the user is watching, and outputs the created image data at the video and audio output terminal 106.

FIG. 2 illustrates a screen displayed on the basis of the image data created by the display video creating section 105.

As shown in the figure, the screen 202 now being broadcast is displayed as a small screen on the screen 201 that the user is watching, with an alarm notice 203 that the frame has already been displayed appearing below the small screen. The alarm notice 203 may be prevented from being displayed by request of the user. The small screen 202 may be expanded to the full size.

Using a remote controller (not shown) or a control button (not shown) provided for the moving picture processing method of the present invention, the user informs the display video creating section 105 from an operation input terminal 110 via an operation interface 108 of an answer to the question made and displayed on the screen 201 by the method.

Depending on the answers from the user, the moving picture processing apparatus of the present embodiment operates in three manners as follows, for example.

(1) As shown in FIG. 3, the video and audio signal inputted from the video and audio input terminal 101 is stopped from being outputted from the video and audio output terminal 106 for the time (e.g., two minutes) that the user has specified beforehand. After the specified time has elapsed, the output. of the video and audio signal is started again and the user is informed in speech of the restart.

Figure 4:
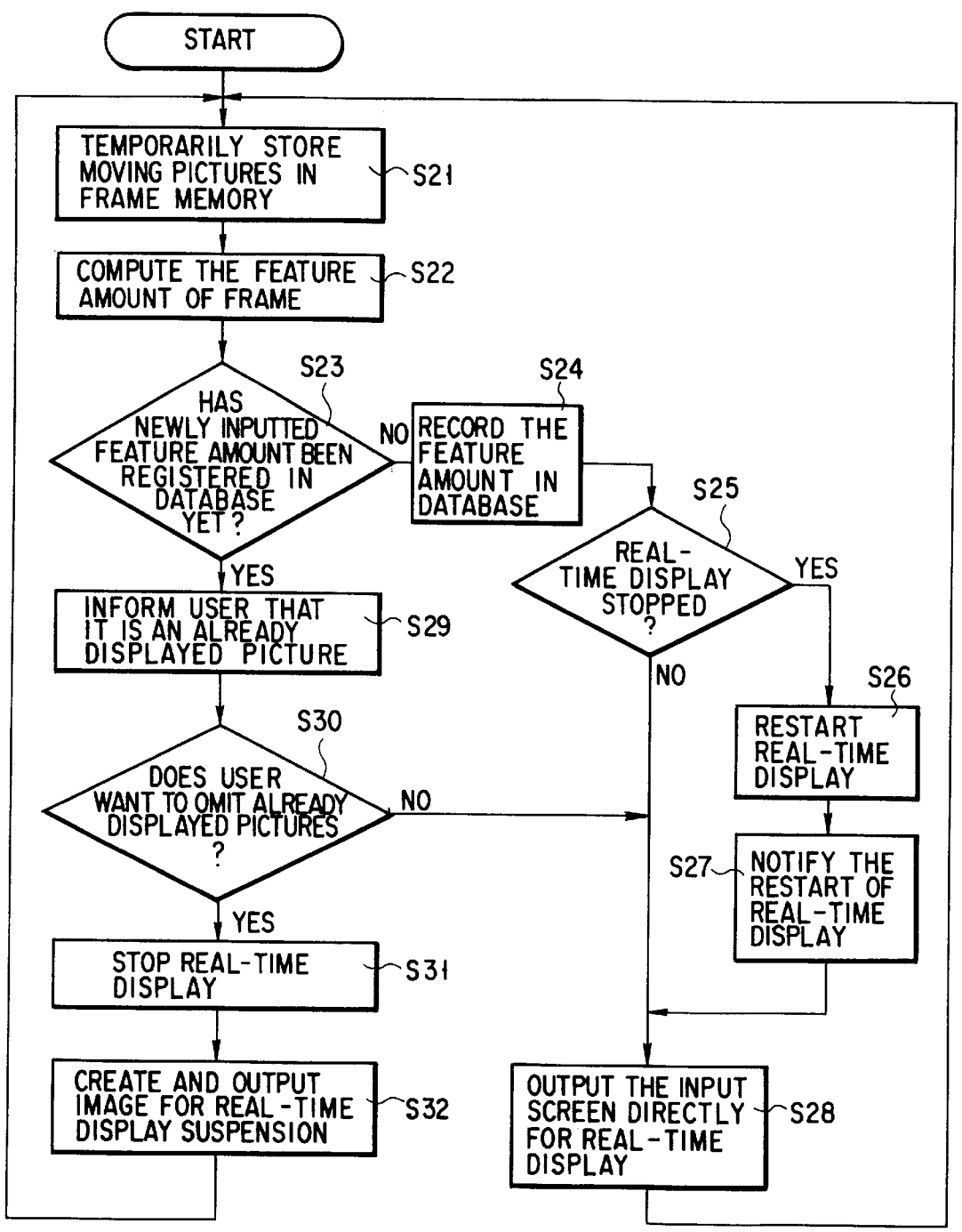
FIG. 4 is a flowchart of the operation of the moving picture processing apparatus according to the first embodiment of the present invention.

(2) As shown in FIG. 4, the output is stopped until the inputted picture has reached a scene not judged to have already been displayed. When a new scene is inputted, the output is restarted and simultaneously the user is informed in speech of the restart.

Figure 5:
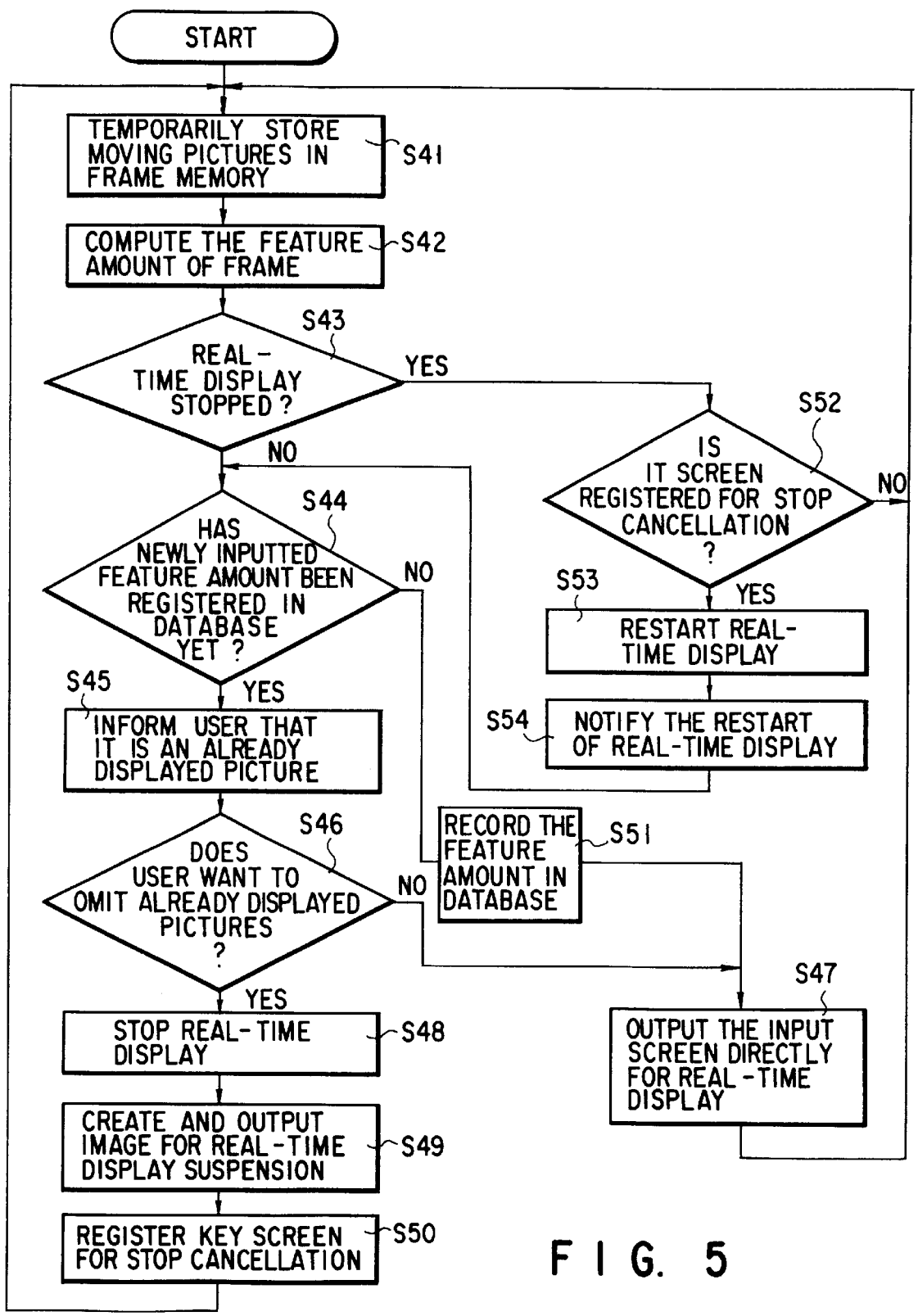
FIG. 5 is a flowchart of the operation of the moving picture processing apparatus according to the first embodiment of the present invention.

(3) As shown in FIG. 5, the output is stopped until a video having the feature amount previously specified by the user has been inputted. When the video having the specified feature amount is inputted, the output is restarted and simultaneously the user is informed in speech of the restart.

Next, the operation of item (1) will be described by reference to the flowchart of FIG. 3.

First, a judgment is made as to whether or not real-time display is out of operation (S1). Specifically, a judgment is made as to whether or not the video and audio signal inputted from the video and audio input terminal 101, or the moving picture, is outputted from the video and audio output terminal 106.

Then, when it has been judged that the real time display is not out of operation, the moving picture inputted from the video and audio input terminal 101 is accumulated in the frame memory 102 temporarily (S2).

Next, the feature amount computing section 103 extracts the feature amount of the frame of moving pictures accumulated in the frame memory 102 (S3). Then, the similarity judging section 104 judges whether or not the extracted feature amount has already been registered in the feature amount database 107 (S4).

At step S4, when it has been judged that the extracted feature amount has not been registered in the feature amount database 107 yet, this means that the inputted picture is a new picture, so the extracted feature amount is stored in the feature amount database 107 (S5).

Then, the display video creating section 105 outputs the video and audio signal corresponding to the extracted frame at the video and audio output terminal 106 (S6). As a result, the picture corresponding to the frame is displayed in real time. Then, control returns to the process of step S1.

In contrast, when at step S4, it has been judged that the extracted feature amount has already been registered in the feature amount database 107, this means that the inputted picture is an already displayed picture, so the display video creating section 105 creates message data for displaying the message that the picture has already been displayed and outputs the message data at the video and audio output terminal 106, thereby informing the user (S7).

Next, a judgment is made as to whether or not the user wants to omit the already displayed pictures (S8). This judgment is made at the display video creating section 105 on the basis of the answer to the question inputted from the operation input terminal 110 via the operation interface 108.

When at step S8, it has been judged that the user does not want to omit the already displayed pictures, the process at step 6 will be executed.

In contrast, when at step S8, it has been judged that the user wants to omit the already displayed pictures, the real-time display is stopped (S9) and the display video creating section 105 creates a picture for real-time display suspension and outputs the created picture to the video and audio output terminal 106 (S10). The real-time display suspension picture may be what appears in part of the real-time display picture.

Then, control returns to the process of step S1. At step S1, a judgment is made as to whether or not the real time display is out of operation (S1). When at step S1, it has been judged that the real-time display is out of operation, then a judgment will be made as to whether or not the real-time display stop time has passed the preset time (S11).

When at step S11, it has been judged that the real-time display stop time has not passed the preset time, control will return to the process or step S1.

In contrast, when at step S11, it has been judged that the real-time display stop time has passed the preset time, the real-time display will be restarted (S12). Next, the display video creating section 105 creates audio data to the effect that the real time display is restarted and outputs the data at the video and audio output terminal 106. This informs the user of the restart of the real-time display (S13). After the completion of the process at step S13, control returns to the process of step S2.

The approach in item (1) is an approach relatively easy to apply to whatever contents of broadcasting. For instance, when watching a television drama, many people do not want to watch the same commercial again and again.

In the operation of item (1), when the contents of the broadcast have changed to a spot commercial, the screen output is stopped for a specific length of time typical of the commercial, for example, two minutes or one and half minutes, so the commercial will not prevent the user from keeping his or her mind on the contents of the story or the user will not be irritated by a commercial with loud sound.

Next, the operation of item (2) will be described by reference to the flowchart of FIG. 4.

First, the moving pictures inputted from the video and audio input terminal 101 are accumulated temporarily in the frame memory 102 (S21). Then, the feature amount computing section 103 extracts the feature amount of the frame of moving pictures stored in the frame memory 102 (S22).

Then, the similarity judging section 104 judges whether or not the extracted feature amount has already been registered in the feature amount database 107 (S23).

When at step 23, it has been judged that the extracted feature amount has not been registered in the feature amount database 107 yet, this means that the inputted picture is a new picture, so the extracted feature amount is stored in the feature amount database 107 (S24).

Next, a judgment is made as to whether or not the real-time display is out of operation (S25). Specifically, a judgment is made as to whether or not the video and audio signal inputted from the video and audio input terminal 101, or the moving picture, is outputted from the video and audio output terminal 106.

When at step 25, it has been judged that the real-time display is out of operation, the real-time display is restarted (S26). Then, the display video creating section 105 creates audio data for restarting the real-time display and outputs the audio data at the video and audio output terminal 106. This informs the user of the restart of the real-time display (S27).

Then, the display video creating section 105 outputs the video and audio signal corresponding to the extracted frame from the video and audio output terminal 106 (S28). As a result, the picture corresponding to the frame is displayed in real time. Then, control returns to the process of step S21.

In contrast, when at step S25, it has been judged that the real-time display is not out of operation, the process at step 28 is executed and then control returns to step S21.

When at step S23, it has been judged that the extracted feature amount has not been registered in the feature amount database 107 yet, this means that the inputted picture is an already displayed picture, so the display video creating section 105 creates message data for displaying a message that the inputted picture has already been displayed and outputs the message data at the video and audio output terminal 106, thereby informing the user (S29).

Next, a judgment is made as to whether or not the user wants to omit the already displayed pictures (S30). This judgment is made at the display video creating section 105 on the basis of the answer to the question inputted from the operation input terminal 110 via the operation interface 108.

When at step S30, it has been judged that the user does not want to omit the already displayed pictures, the process at step 28 will be executed.

In contrast, when at step S30, it has been judged that the user wants to omit the already displayed pictures, the real-time display is stopped (S31) and the display video creating section 105 creates a picture for real-time display suspension and outputs the created picture to the video and audio output terminal 106 (S32). Then, control returns to the process of step S21. The real-time display suspension picture may be what appears in part of the real-time display picture.

The approach of item (2) is effective in a talk show or the like. For example, in the case of a talk show with an interviewer and an interviewee, the screen is mainly composed of a close-up of the interviewer, a close-up of the interviewee, a close-up of the two, a long shot of the two (distant view), the spectators in the site, or some other scenes. These scenes appear on the screen repeatedly.

After registering each of the repeated scenes in the feature amount database 107 once, the user can stop the output of the video until the talk show has finished.

Next, the operation of item (3) will be described by reference to the flowchart of FIG. 5.

First, the moving pictures inputted from the video and audio input terminal 101 are accumulated temporarily in the frame memory 102 (S41). Then, the feature amount computing section 103 extracts the feature amount of the frame of moving pictures stored in the frame memory 102 (S42).

Next, a judgment is made as to whether or not the real-time display is out of operation (S43). Specifically, a judgment is made as to whether or not the video and audio signal inputted from the video and audio input terminal 101, or the moving picture, is outputted from the video and audio output terminal 106.

When at step S43, it has been judged that the real-time display is not out of operation, the similarity judging section 104 judges whether or not the extracted feature amount has already been registered in the feature amount database 107 (S44).

When at step S44, it has been judged that the extracted feature amount has already been registered in the feature amount database 107, this means that the inputted picture is an already displayed picture, so the display video creating section 105 creates message data for displaying a message that the inputted picture has already been displayed and outputs the message data at the video and audio output terminal 106, thereby informing the user (S45).

Next, a judgment is made as to whether or not the user wants to omit the already displayed pictures (S46). This judgment is made at the display video creating section 105 on the basis of the answer to the question inputted from the operation input terminal 110 via the operation interface 108.

When at step S46, it has been judged that the user does not want to omit the already displayed pictures, the video and audio signal corresponding to the extracted frame is outputted from the video and audio output terminal 106 (S47). As a result, the picture corresponding to the frame is displayed in real time. Then, control returns to the process of step 41.

In contrast, when at step S46, it has been judged that the extracted feature amount has already been registered in the feature amount database 107, the real-time display is stopped (S48) and the display video creating section 105 creates a picture for real-time display suspension and outputs the created picture to the video and audio output terminal 106 (S49). The real-time display suspension picture may be what appears in part of the real-time display picture.

Then, a key screen for canceling the stop is registered (S50) and control returns to the process of step S41. The key screen is registered by giving operation instructions from the operation input terminal 110 via the operation interface 108 to the display video creating section 105. The object to be registered is the feature amount corresponding to the key screen.

In contrast, when at step 44, it has been judged that the extracted feature amount has not been registered in the feature amount database 107, this means that the inputted picture is a new picture, so the extracted feature amount is stored in the feature amount database 107 (S51), and control returns to the process of step 47.

When at step S43, it has been judged that the real-time display is out of operation, a judgment is made as to whether or not the screen of the inputted frame is the screen set for stop cancellation, that is, the key screen (S52).

When at step S52, it has been judged that the screen of the inputted frame is not the screen set for stop cancellation, control returns to the process of step S41 again.

In contrast, when at step S52, it has been judged that the screen of the inputted frame is the screen set for stop cancellation, the real-time display is restarted (S53). Then, the display video creating section 105 creates audio data for restarting the real-time display and outputs the data at the video and audio output terminal 106. This informs the user of the restart of the real-time display (S54). After the process at step S54 has been completed, control returns to the process of step S44.

The approach of item (3) is effective in news programs. With the news program, when the topic is changed, a close-up of the newscaster or a combination of the newscaster and a small screen carrying news items often appear on the screen.

When the picture is a skippable registered picture, the picture processing apparatus of the present embodiment informs the user that the picture is an already displayed picture, at the time that the video of news items already watched on another channel has started. At this time, by specifying "until the next skippable picture," the user can stop the news from being outputted until the next item of news.

Furthermore, for instance, in a case where similar images are repeated as many times as the number of participants as in ski jump, when the frame where a participant is going to glide is a skippable registered picture, the user can watch only the frame of gliding preparation and stop the output until the next participant has appeared on the screen if the user does not want to watch the current participant skiing.

During the time when the video and audio output has been stopped, the frame immediately before the stop may be outputted in the form of a still picture, or a still picture that the user has registered beforehand, for example, the user's favorite scenery, may be outputted. When the user has more than one tuner, such as ground wave and BS broadcasting, the video on another channel may be displayed during the time when the output has been stopped.

Furthermore, by registering the opening picture of the desired program as a skippable picture, the user can watch the desired program without fail. For instance, even when the program has been changed as a result of the extension of a sports live relay broadcast, the user can watch (videotape) the desired program without fail.

Second Embodiment

Hereinafter, a moving picture processing apparatus according to a second embodiment of the present invention will be explained.

Figure 6:
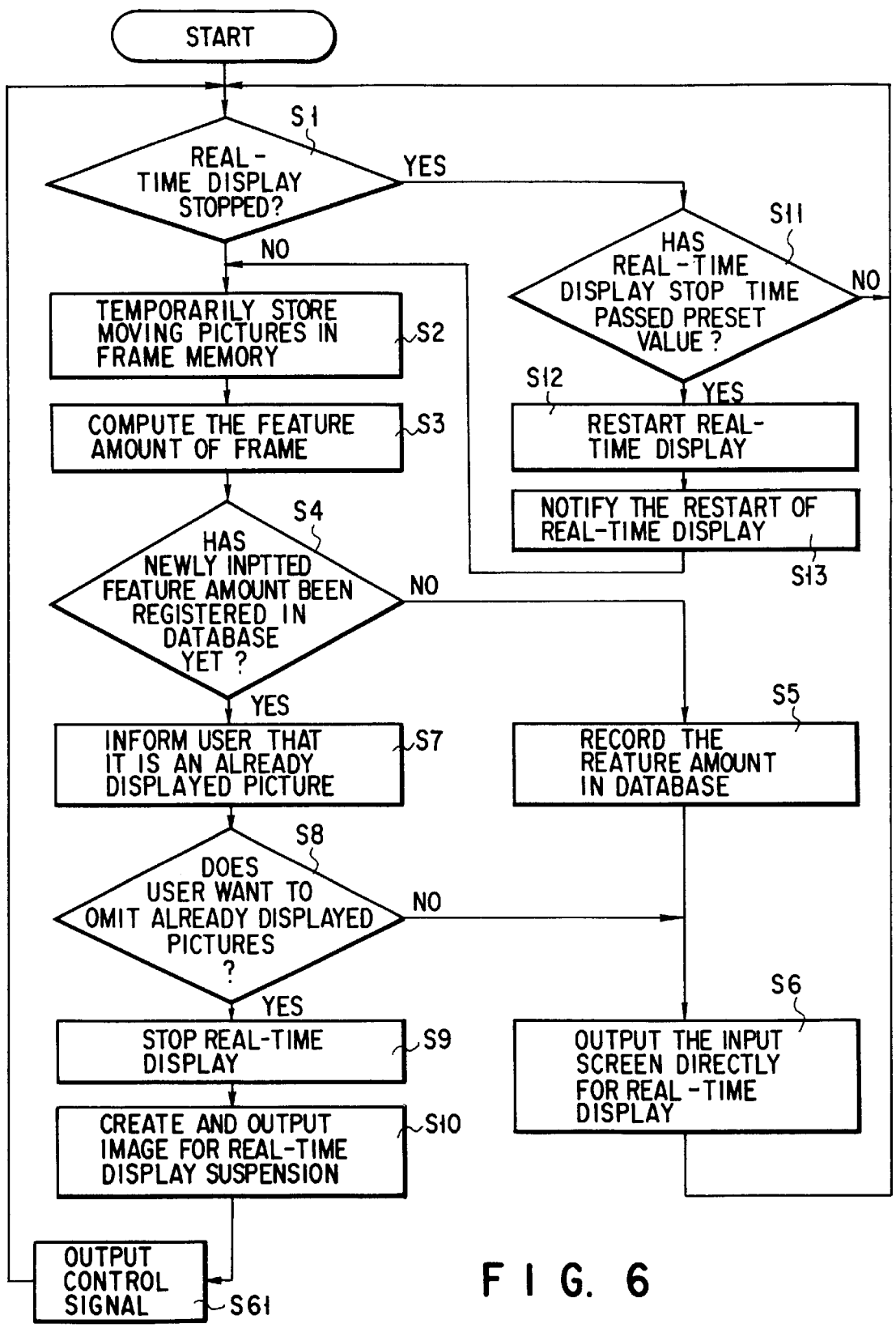
FIG. 6 is a flowchart of the operation of the moving picture processing apparatus according to a second embodiment of the present invention.
Figure 7:
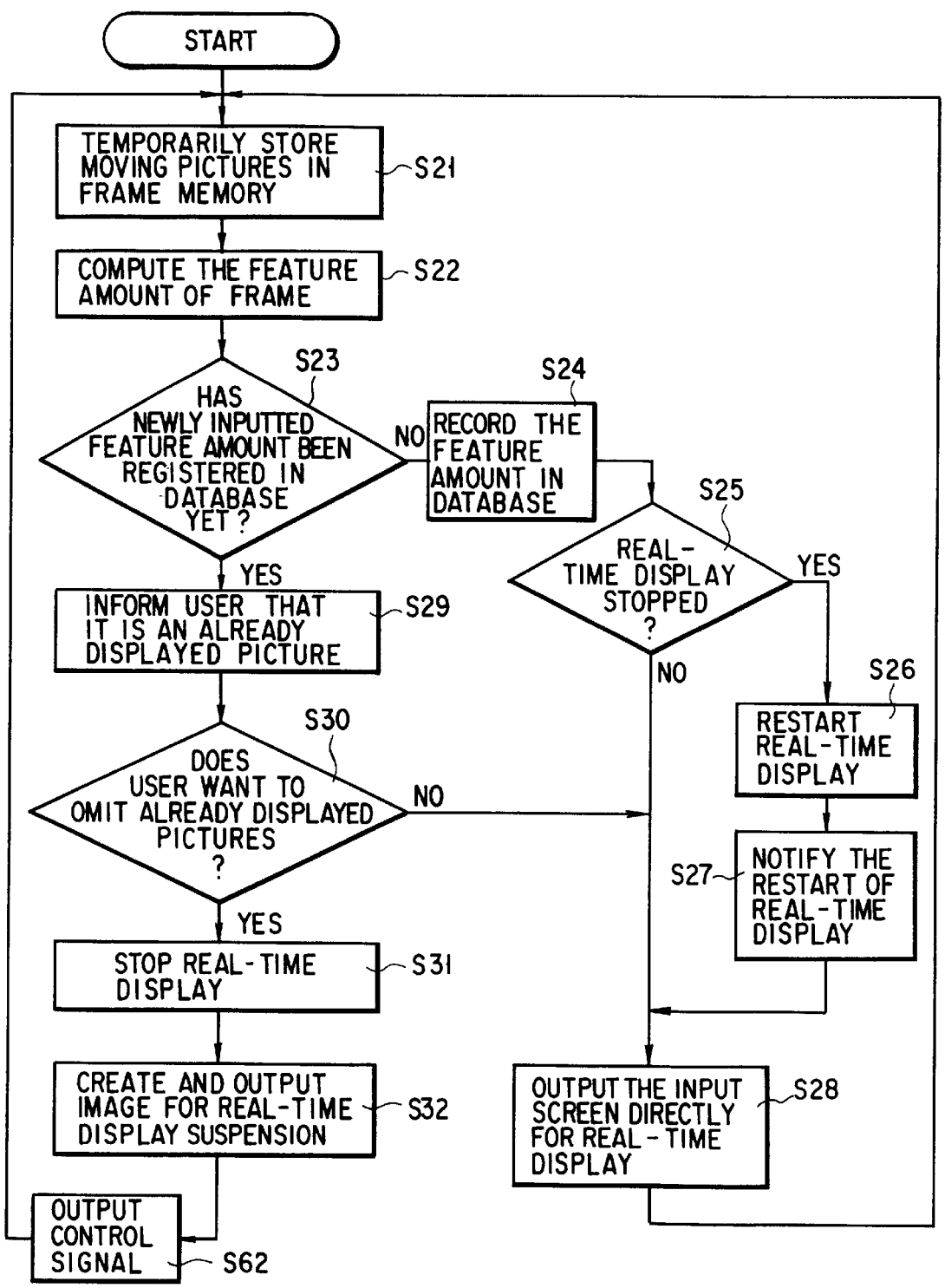
FIG. 7 is a flowchart of the operation of the moving picture processing apparatus according to the second embodiment of the present invention.
Figure 8:
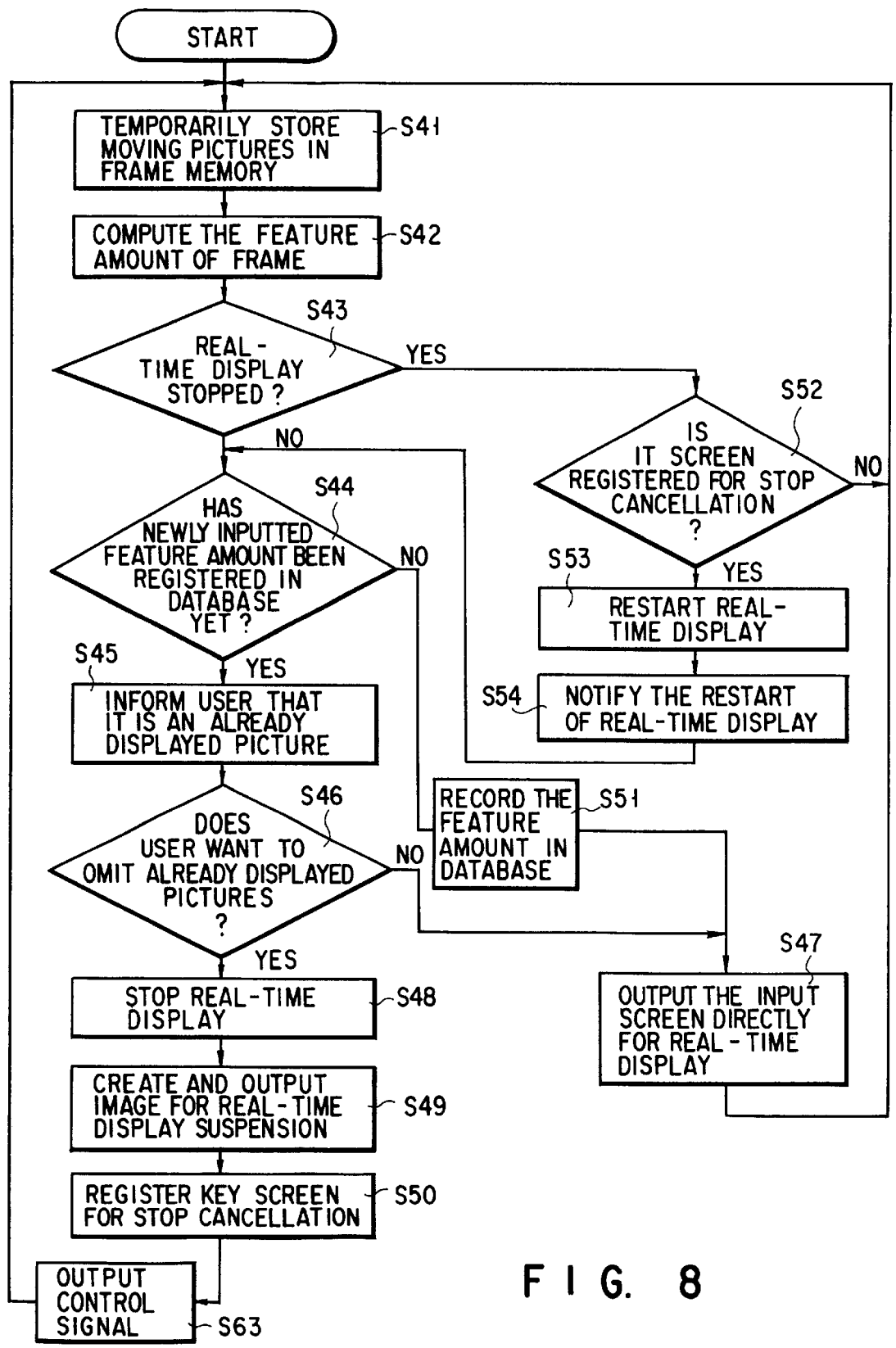
FIG. 8 is a flowchart of the operation of the moving picture processing apparatus according to the second embodiment of the present invention.

FIGS. 6 to 8 are flowcharts for the operation of the moving picture processing apparatus according to the second embodiment of the present invention. The configuration of the moving picture processing apparatus of the second embodiment is the same as that of the moving picture processing apparatus of the first embodiment shown in FIG. 1.

The operation of the moving picture processing apparatus of the second embodiment differs from that of the moving picture processing apparatus of the first embodiment in that the function of outputting a control signal for controlling an external device is added.

Specifically, with the moving picture processing apparatus of the second embodiment, the step of outputting a control signal to a device acting as a video source, such as a videotape playback unit, a laser disk player, or a digital disk player, during the time when the output of the input video has been stopped, is added in the flowcharts in FIGS. 3 to 5 (step S61, step S62, and step S63).

The control signal is outputted at the control signal output terminal 109. On the basis of the control signal, when the device acting as a video source is a laser disk, for example, control skips to the next chapter (index); and when the device is a videotape player, a playback operation or a fast-forward operation is carried out.

When the device serving as a video source is not provided with a mechanism that receives the control signal generated by the moving picture processing method of the present invention, an originating unit (not shown) capable of outputting a video source remote controller signal may be connected to the control signal output terminal 109 and the video source may be controlled using the remote controller signal.

It is assumed that the method of determining the similarity and the setting of a reference level for judging whether or not the picture has already been displayed have been specified for the apparatus as the standard method and the standard value. The user may give an instruction to change the value to another value by way of the operation input terminal 110.

Furthermore, even when the video source is a tuner, connecting the control signal output terminal 109 to a videotape recorder (VTR) causes the recorder to stop the recording by the above method during the time when the video output has been stopped. This makes it possible to easily select the necessary portions from the video currently being broadcast and record them.

Third Embodiment

Hereinafter, a moving picture processing apparatus according to a third embodiment of the present invention will be explained.

While the moving picture processing apparatuses in the first and second embodiments make similarity judgments frame by frame, the moving picture processing apparatus of the third embodiment makes similarity judgments shot by shot.

The similarity judgment method of the third embodiment will be described.

Figure 9:
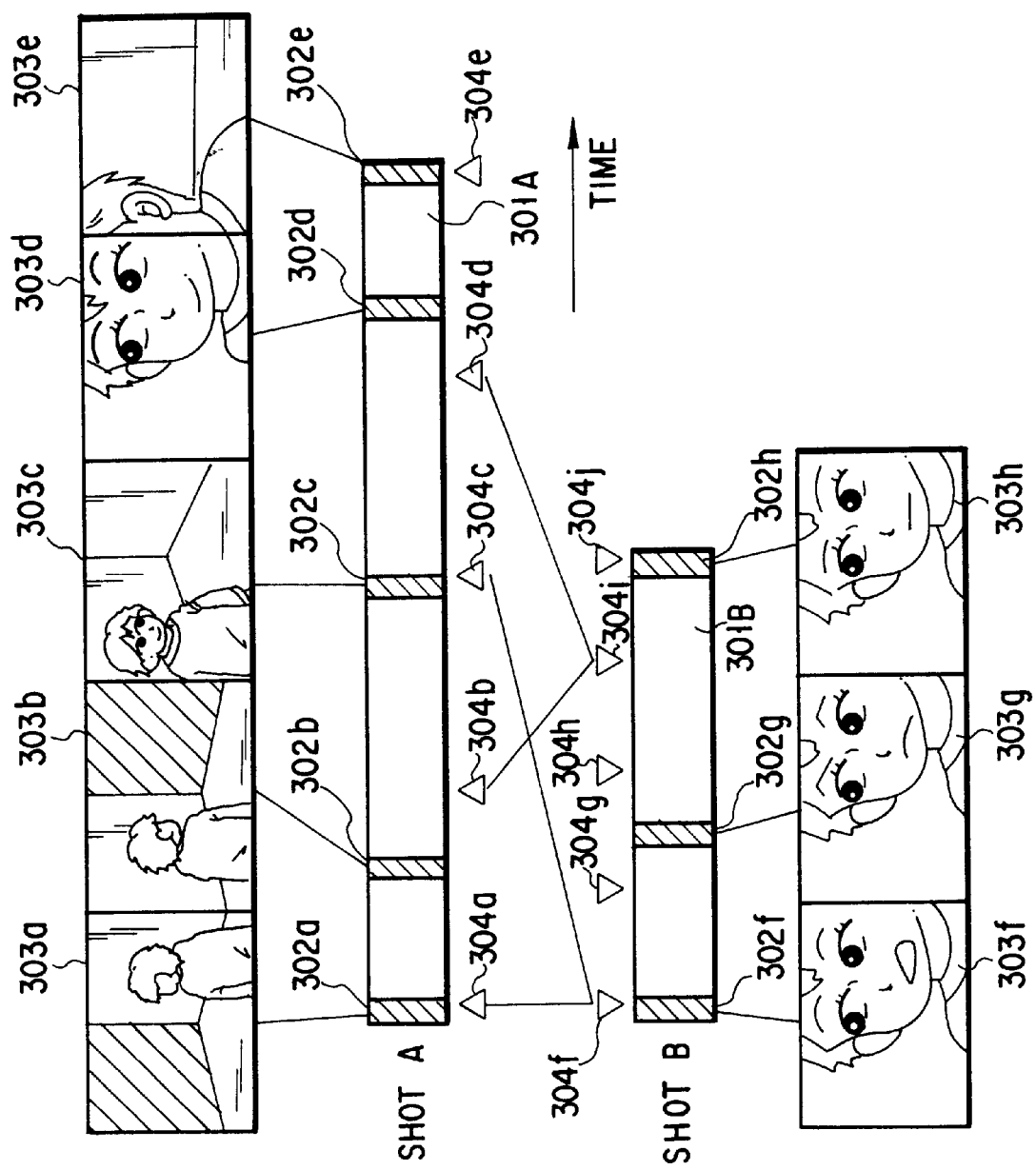
FIG. 9 pictorially shows scenes in the pictures.

FIG. 9 pictorially shows scenes in the video.

In the figure, 301A and 301B represent two shots that do not overlap with each other in time. As time passes, the position of the picture moves to the right. Here, a shot is defined as a time section of video recorded without stopping the filming device.

302a to 302h represent frames (still pictures or temporal cross sections of video) in each shot. The image at each corresponding point of time is indicated by 303a to 303h, respectively.

Shot 301A is such that a person is filmed by moving the camera continuously from behind the person at an angle to the left (303a) to the right (303b), and from ahead of the person at an angle to the right (303c). Then, the person is zoomed in (303d). Finally, the person is filmed by the camera over the person's shoulder (303e).

On the other hand, shot 301B is a shot of the same person in shot 301A talking in close-up.

One method of judging whether or not two shots resemble each other is a method of creating the average pictures for all of the frames in the shots and comparing them. With this method, however, because changes in the state of shot B are small, the average picture does not differ much from the pictures 303*f* to 303*h* in shot B, whereas because changes in the state of shot A are large, the average picture is diffuse, canceling out the feature of each frame. Consequently, determining the similarity between shot A and shot B by the method of averaging pictures is not suitable for the two shots.

Even if the values (luminance and hue) of pixels in all of the frames in the shots are averaged, because the color of the wall in front of the person in frame 303*a*, frame 303*b*, and adjacent frames does not appear in shot B and the wall takes up a large area in shot A, the two shots are not judged to be similar to each other.

As described above, the method of computing a single feature amount from the entire shot cannot expresses the feature of a violently moving shot exactly.

In FIG. 9, shot A resembles shot B in parts. For example, 303*d* in shot A is very similar to the frames in shot B.

With the third embodiment, when a plurality of frames are selected from shots, the similarity between them is computed, and the similarity of a combination of the most similar frames is larger than the threshold value, the two shots are judged to be similar to each other.

Specifically, with the third embodiment, the feature of the beginning-of a shot (304*a*, 304*f*), the feature of the middle of the shot (304*c*, 304*h*), the feature of the end of the shot (304*e*, 304*j*), the feature of the middle of the section between the beginning and middle of the shot (304*b*, 304*g*), and the feature of the middle of the section between the middle and end of the shot (304*d*, 304*i*), are calculated.

Here, the feature amount may be the average of the values of pixels in a picture or the histogram of hues, in addition to what has been explained in the first embodiment.

In this way, five feature amounts are obtained from each of shot A and shot B. One feature amount is selected from the five feature amounts of shot A and similarly one feature amount is selected from the five feature amounts of shot B. Then, the similarity between these selected ones is computed.

Explanation as to how to compute the similarity has been given in the first embodiment. With the second embodiment, the similarity is computed for 5×5=25 combinations.

FIG. 9 shows some of the combinations, but not all. Computing the similarity concerning the combinations shows that the similarity of 304*f* to 304*j* of shot B to 304*a*, 304*b*, 304*c*, 304*e* is low but the similarity of the frames of shot B to 304*d* is high.

Therefore, for the 2.5 ways of similarity calculations, the value of the highest similarity comes from a combination of 304*d* and any one of 304*f* to 304*j*. When the highest similarity is larger than the threshold value set by the user, it has been judged that shot A resembles shot B.

The number of feature amount computation frames selected from the shot may not be five. The frames may not be selected at regular intervals. If the number of selected frames is three, the beginning frame, middle frame, and end frame of the shot have only to be selected. In this case, the number of combination calculations is reduced to nine. Conversely, all of the frames in the shot may be selected.

For example, in the embodiment, the hue histograms of the beginning frame, middle frame, and end frame of the shot may be stored in the feature amount database 107 as the feature amount of the already displayed pictures. Then, when one frame of new pictures is similar to the stored frames, the new frame may be stopped from being displayed.

Figure 10:
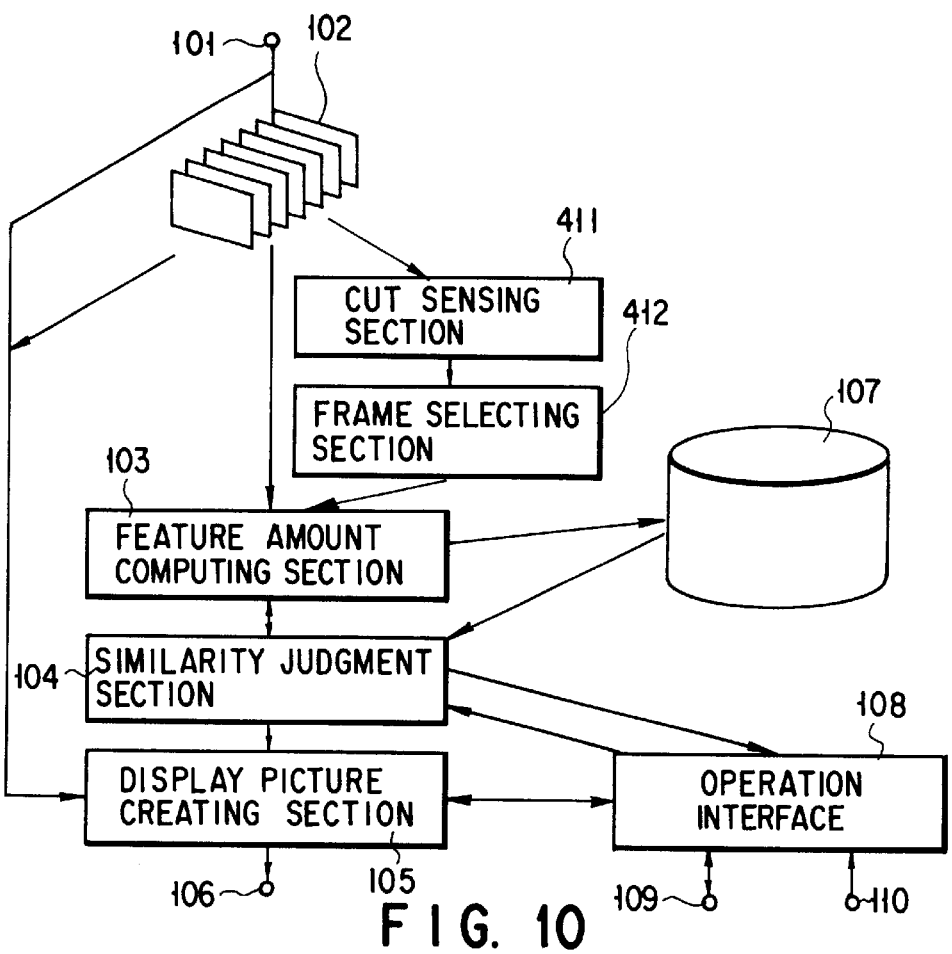
FIG. 10 shows a moving picture processing apparatus according to a third embodiment of the present invention.

FIG. 10 shows a moving picture processing apparatus according to the third embodiment of the present invention.

As shown in FIG. 10, the moving picture processing apparatus of the third embodiment differs from the moving picture processing apparatus of FIG. 1 in that the former is provided with a cut sensing section 411 and a frame selecting section 412. A frame memory 102 is capable of storing plurality of frames.

Figure 11:
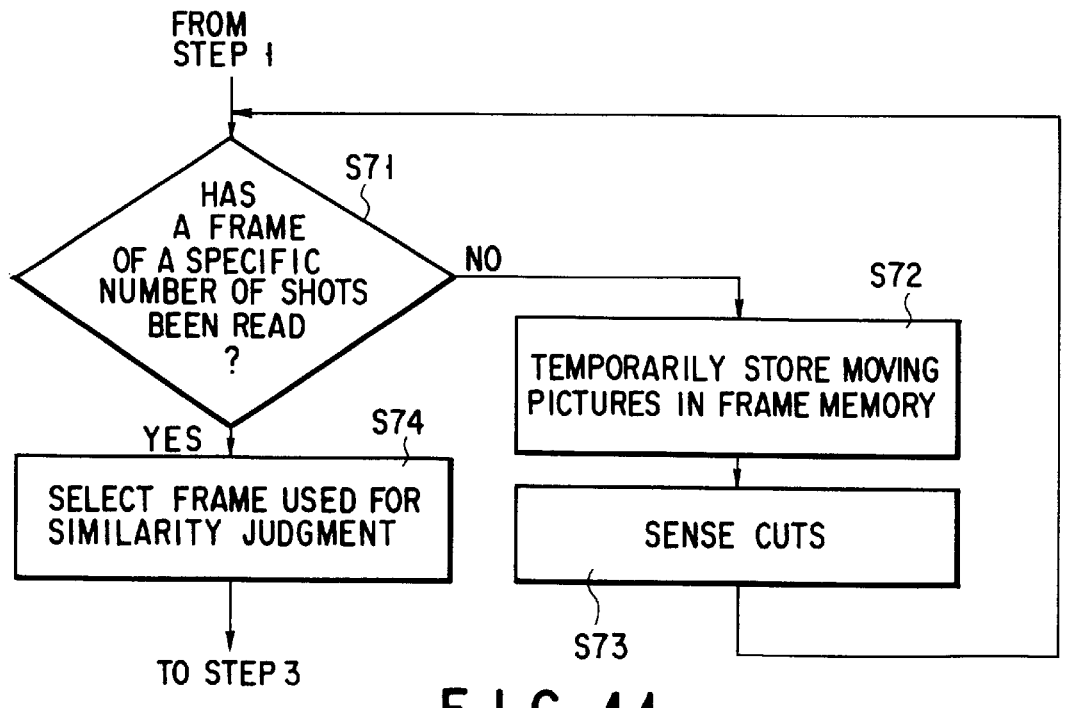
FIG. 11 is a flowchart of part of the operation of the moving picture processing apparatus according to the third embodiment of the present invention.

FIG. 11 is a flowchart for part of the operation of the moving picture processing apparatus of the third embodiment. It is assumed that the processes ranging from step S71 to S74 in FIG. 11 are executed in place of the process at step S2 in FIG. 3.

Hereinafter, the operation of the moving picture processing apparatus of the third embodiment will be described by reference to FIGS. 10 and 11.

First, the cut sensing section 411 judges whether or not a specific number of frames of the shots have been read (S71). When at step S71, it has been judged that a specific number of frames of the shots have not been read, the moving pictures inputted from the video input terminal 101 are stored temporarily in the frame memory 102 (S72). Next, the cut sensing section 411 senses cuts (S73), and then control returns to the process of step S71.

In contrast, when at step S71, it has been judged that a specific number of frames of the shots have been read, the frames used for similarity judgment are selected from the shots (S74). The method of selecting the frames has been described at the beginning of the explanation of the present embodiment.

The flow of the following processing is basically the same as the processing flow explained in FIG. 3.

While in the third embodiment, the operation of FIG. 3 has been explained, the processes from step S71 to S74 of FIG. 11 may be executed in place of the process at step S21 shown in FIGS. 4 and 7.

Alternatively, the processes from step S71 to S74 of FIG. 11 may be executed in place of the process at step S41 shown in FIGS. 5 and 8.

Still alternatively, the processes from step S71 to S74 of FIG. 11 may be executed in place of the process at step S2 shown in FIG. 6.

Consequently, with the third embodiment, a judgment can be made shot by shot as to whether or not shots are similar to each other, which enables the process of preventing similar shots from being displayed.

Fourth Embodiment

Hereinafter, a moving picture processing apparatus according to a fourth embodiment of the present invention will be explained.

Figure 12:
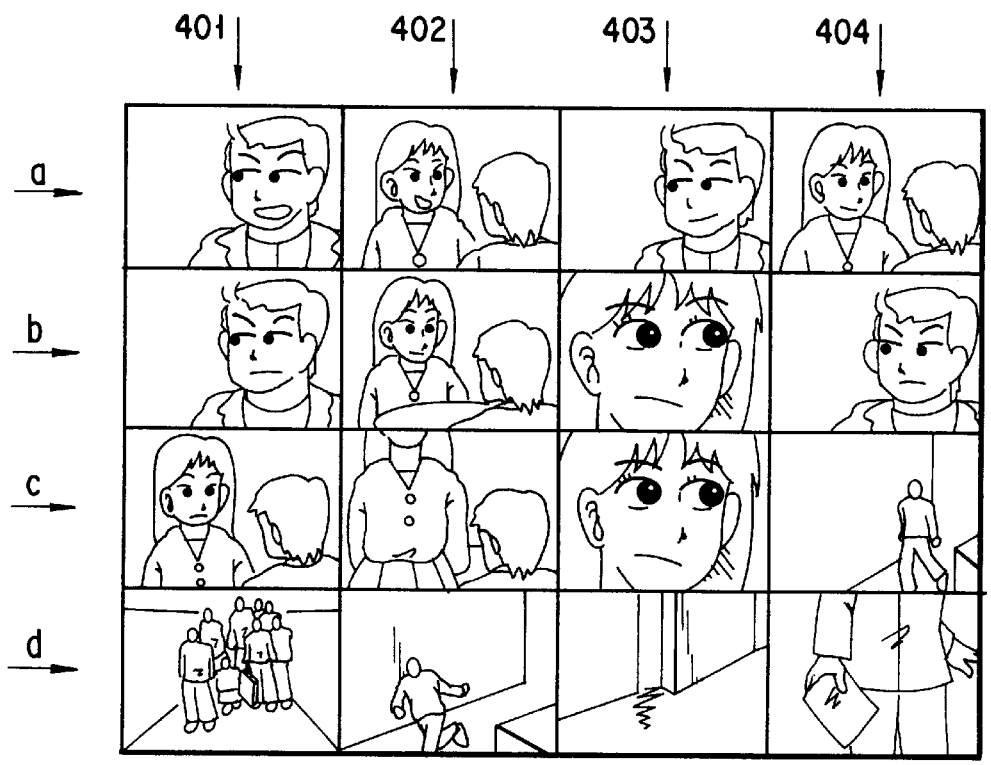
FIG. 12 illustrates a display screen where a single small screen (icon) is displayed for each scene change of in a fictitious video.

FIG. 12 shows a display screen where a single small screen (icon) appears for each scene change (a cut or a partition between the above-described shots) of in a fictitious video.

FIG. 12 shows a single screen with 16 icons appearing simultaneously on the screen. Hereinafter, each icon is indicated by row and column like column 401 row a, or simply 401*a*.

In this example, it is assumed that the time sequence of the shots represented by icons proceeds from left to right in a row and that column 404 at the right end is followed by column 401 in the next row, that is, in the order of from top to bottom. Namely, the shots are arranged in this order: 401*a*, 402*a*, 403*a*, 404*a*, 401*b*, . . . , and the last shot is 404*d* in the screen.

In FIG. 12, part of each of two consecutive scenes is shown. The first scene begins with 401a or a shot (not shown) before 401a and ends with 403c.

The second scene begins with 404c and last to 404d or a shot (not shown) behind 404d. For the sake of convenience, the former scene is called scene A and the latter is called scene B.

Scene A is a scene of a couple enjoying a chat in a coffee shop. Such a scene of a couple having a conversation is often seen in movies. In such a case, a close-up of each of the couple talking often appears on the screen.

Displaying such a scene using icons cut by cut increases the number of icons to be displayed, which decreases the amount of information that can be transmitted with a single screen.

With the moving picture processing apparatus according to the fourth embodiment, when the shot similarity judging method described in the third embodiment has judged that shots are similar, they are deleted from the list screen.

In the case of the display screen of FIG. 12, 401a, 403a, 401b, and 404b are obtained by shooting the same person with the same composition. They are very similar. As a result, the shot similarity judging method explained in the third embodiment judges that they are similar scenes.

Similarly, 403b is similar to 403c. 402a, 404a, 402b, and 401c are similar to each other. By selecting one from the shots grouped on condition that they are similar and displaying the icon as the group's icon, the number of icons to be displayed can be reduced.

In the present embodiment, for scene A, 403a, 404a, 401b, 402b, 404b, 401c, and 403c can be prevented from being displayed, which enables seven new icons of another shot (or shot group), displayed on another screen before, to be displayed.

Figure 13:
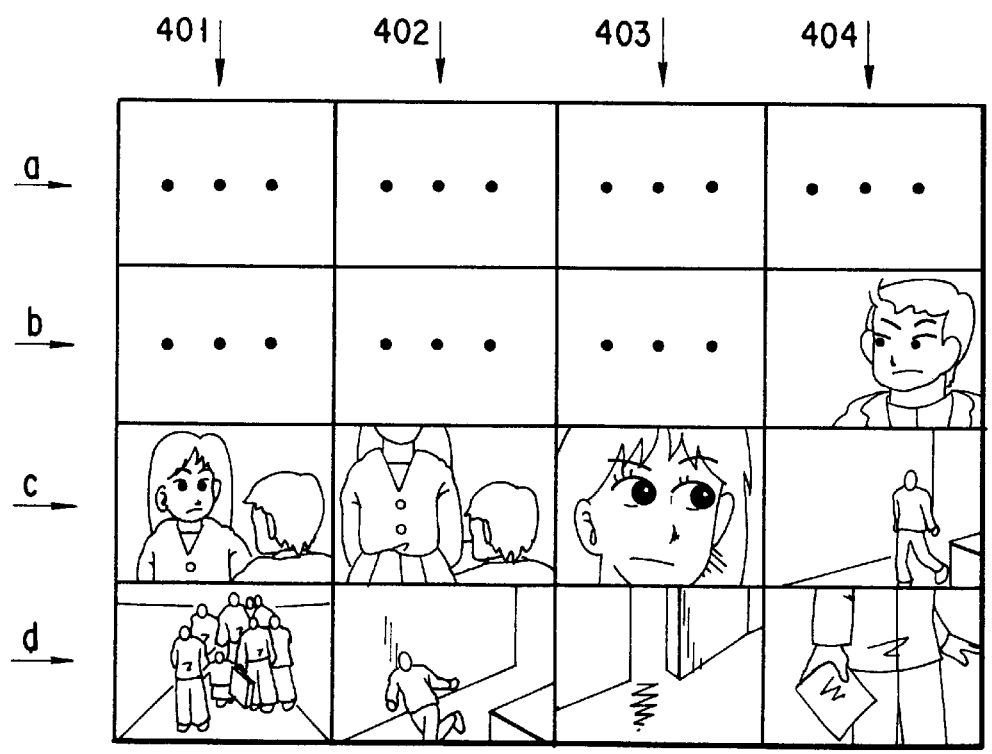
FIG. 13 illustrate a display screen where the similar shots are eliminated.

FIG. 13 shows a display screen where the similar icons are prevented from being displayed. As seen from the figure, new icons can be displayed in seven blanks.

If the same process is performed on scene B, it can be expected that the number of blanks will increase beyond seven. In our tests, a one-minute scene of two persons talking in a movie contained 20 cuts. Because the cuts consisted of the repetition of close-ups of the two persons, the contents could be displayed sufficiently using two representative pictures.

There is no particular limit to a method of selecting representative icons from the shots grouped as described above. When a person appears in a shot, a picture of the person looking straight ahead is more desirable.

The method of selecting looking-ahead faces may refer to whether the number of flesh color pixels in a specified region near the center of the shot is large or small. Alternatively, the method may be such that a typical feature amount of a looking-ahead face is extracted and it is determined whether or not a region similar to the feature amount exists in the frame.

A method of sensing looking-ahead faces has been disclosed in literature (e.g., "Human Face Detection In Visual Scenes," CMU-CS-95-158, Carnegie-Mellon University, U.S.A, 1995). The icons prevented from being displayed as a result of grouping may be marked with the number of shots omitted or special symbols.

FIG. 14 shows a moving picture processing apparatus according to the fourth embodiment of the present invention.

As shown in the figure, the moving picture processing apparatus of the fourth embodiment differs from that of the third embodiment in that the former is provided with an auxiliary video storage device 451. In FIG. 14, the same parts as those in FIG. 10 are indicated by the same reference symbols.

Figure 15:
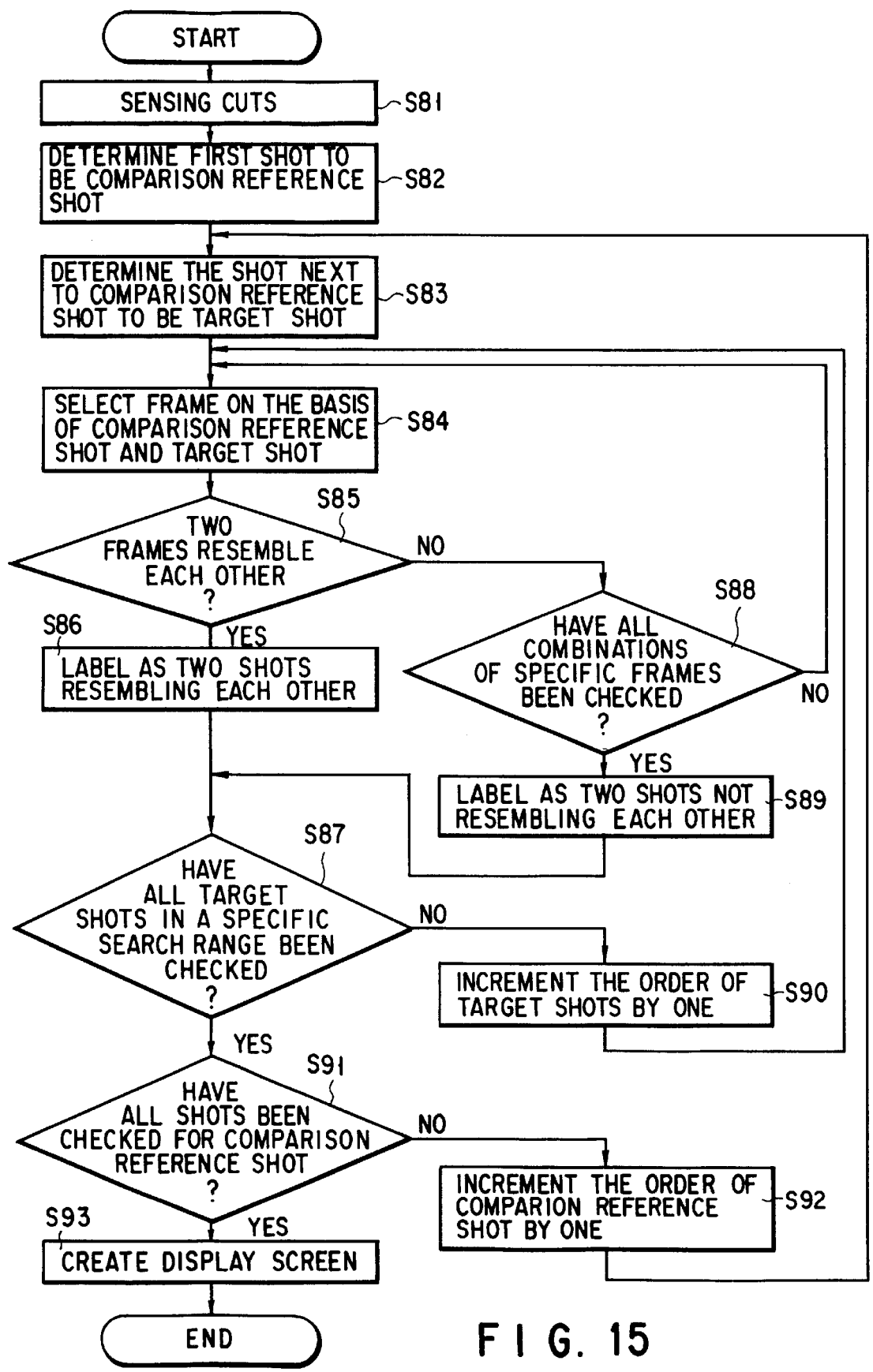
FIG. 15 is a flowchart of the operation of the moving picture processing apparatus according to the fourth embodiment of the present invention.

FIG. 15 is a flowchart to help explain the operation of the moving picture processing apparatus of the fourth embodiment.

First, the moving pictures inputted from the video input terminal 101 are stored in the auxiliary video storage device 451. The moving pictures stored in the auxiliary video storage device 451 are stored in the frame memory in sequence.

Then, the cut sensing section 411 senses cuts of the moving pictures stored in the frame memory 102 (S81).

Next, the first shot is determined to be a comparison reference shot (S82). The shot next to the comparison reference shot is determined to be a target shot (S83).

Then, the frame selecting section 412 selects a frame on the basis of the comparison reference shot and the target shot (S84). A method of selecting a frame from the shots has been explained in the third embodiment.

Next, a judgment is made whether or not two frame, that is, the comparison reference shot and the target shots are similar to each other (S85). The judgment as to whether they are similar is the same as explained in the first to third embodiments and is carried out at the similarity judging section 104.

The operation of the feature amount computing section 103 is the same as explained in the first to third embodiments.

When at step S85, it has been judged that the two shots are similar to each other, the target shot is labeled to the effect that the comparison reference shot is similar to the target shot (S86). Then, a judgment is made as to whether or not the comparison reference shot is similar to each of all of the other target shots in a specific search range (S87). The specific search range is set from the comparison reference shot to the fourth shot therefrom or to the last shot, for example.

In contrast, when at step S85, it has been judged that the comparison reference shot is not similar to the target shot, a judgment is made as to whether or not a similarity judgment has been made on all of the combinations of specific frames (S88). A similarity judgment on the combinations of selected frames has been described in the third embodiment.

When at step S88, it has been judged that a similarity judgment has not been made on all of the combinations of specific frames, control returns to the process of step 84. In contrast, when it has been judged that a similarity judgment has been made on all of the combinations of specific frames, the target shot is labeled to the effect that the comparison reference shot is not similar to the target shot (S89), and control returns to the process of step 87.

When at step S87, it has been judged that the comparison reference shot is similar to none of the target shots in the specific search range, the target shot is advanced to the next one (S90), and control returns to the process of step 84.

When at step S87, it has been judged that the comparison reference shot is similar to all of the target shots in the specific search range, a judgment is made as to whether or not a check has been made using each of all of the shots as the comparison reference shot (S91).

When at step S91, it has been judged that a check has not been made using each of all of the shots as the comparison reference shot, the comparison reference shot is advanced to the next shot (S92), and control returns to the process of step 84.

In contrast, when at step S91, it has been judged that a check has been made using each of all of the shots as the comparison reference shot, the display screen creating section 105 creates a display screen on which only the shots labeled "Dissimilar" appear in the form of icons (S93). Here, the screen carrying icons is a screen for one frame of the shots labeled "Dissimilar."

As a result, as shown in FIG. 13, only a certain screen of the dissimilar shots appears carrying icons.

As described until now, with the present invention, it is possible to provide effective materials for enabling the user to determine in real time whether to watch the pictures currently being broadcast and therefore to provide a comfortable video viewing environment where the user need not watch already watched pictures over and over.

Moreover, with the present invention, since the desired video source is not provided in the apparatus and the broadcast video information is dealt with, it is not necessary to prepare a gigantic video storage medium by the side of the ordinary user. In addition, it is possible to save the user the trouble of storing the video once, editing it, and then watching it.

Furthermore, with the present invention, when pictures are displayed in list form by causing a small screen to represent each scene change, it is possible to reduce the number of icons to be displayed, without impairing the summary of the contents of the pictures, which improves the legibility of the list display.

Additionally, the moving picture processing methods above described can be recorded on a computer readable medium, such as a magnetic disk, optical disk, semiconductor memory etc, as a program which can be executed by a computer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A moving picture processing method comprising:
    selecting a first subset of non-contiguous frames from a first shot of inputted moving picture data; including a first picture
    extracting first feature data from each frame in the first subset of frames selected;
    selecting a second subset of non-contiguous frames from a second shot of inputted moving picture data including a second picture inputted after the first sub set of frames;
    extracting second feature data from each frame of the second subset of frames selected;
    comparing, on a frame-by-frame basis, first feature data of the non-contiguous frames of the first subset with the second feature data of the non-contiguous frames of the second subset; and
    judging, based only on the frames of the first and second subsets, whether or not said first shot is similar to said second shot.

2. A moving picture processing method according to claim 1, further comprising:
    creating first picture data for displaying a first picture corresponding to said first shot, when it is judged that said first shot is not similar to said second shot.

3. A moving picture processing method according to claim 1, further comprising:
    storing said first feature data in a feature database, when it is judged that said first shot is not similar to said second shot.

4. A moving picture processing method according to claim 3, wherein said first feature data includes recording data that indicates the recording date and time that said first feature data has been recorded in said feature database.

5. A moving picture processing method according to claim 1, further comprising:
    outputting second picture data for displaying a second picture corresponding to said second shot, when it is judged that said first shot is not similar to said second shot.

6. A moving picture processing method according to claim 1, further comprising:
    creating message data for displaying a message that a first picture corresponding to the first shot has already been displayed at least in a part of said second picture, when it is judged that said first shot is similar to said second shot.

7. A moving picture processing method according to claim 1, wherein said moving picture data includes audio data.

8. A moving picture processing method according to claim 1, wherein:
    said first feature data includes first average value data that indicates the average value of three primary colors in each pixel region of said first picture divided into specific pixel regions; and
    said second feature data includes second average value data that indicates the average value of three primary colors in each pixel region of said second picture divided into specific pixel regions.

9. A moving picture processing method according to claim 1, wherein:
    said first feature data includes first luminance data indicating the luminance of said first picture, first color difference data indicating the color difference between the luminance and red, and second color difference data indicating the color difference between the luminance and blue; and,
    said second feature data includes second luminance data indicating the luminance of said second picture, third color difference data indicating the color difference between the luminance and red, and fourth color difference data indicating the color difference between the luminance and blue.

10. A moving picture processing method according to claim 1, wherein said first feature data includes first luminance data indicating the luminance of said first picture and said second feature data includes second luminance data indicating the luminance of said second picture.

11. A moving picture processing method according to claim 1, wherein:
    the first subset of frames includes a beginning frame, middle frame, and end frame of said first shot, and a frame between the beginning and middle frames, and a frame between the middle and end frames; and
    the second subset of frames includes a beginning frame, middle frame, and end frame of said second shot, and a frame between the beginning and middle frames, and a frame between the middle and end frames.

12. A moving picture processing apparatus comprising:
    a selecting section configured to select a first subset of non-contiguous frames from a first shot of inputted moving picture data; including a first picture an extracting section configured to extract first feature data from each frame in the first subset of frames selected;

a comparing section, configured to compare, on a frame-by-frame basis, (1) second feature data extracted from a second subset of non-contiguous frames selected from a second shot of moving picture data including a second picture and (2) the first feature data; and a judging section configured to judge, based only on an output of the comparing section, whether or not said first shot is similar to said second shot.

13. A moving picture processing apparatus according to claim 12, further comprising:

a first creating section configured to create first picture data for displaying a first picture corresponding to said first shot, when it is judged that said first shot is not similar to said second shot.

14. A moving picture processing apparatus according to claim 12, further comprising:

a feature database; and a storage section configured to store said first feature data in said feature database, when it is judged that said first shot is not similar to said second shot.

15. A moving picture processing apparatus according to claim 14, wherein said first feature data includes recording data that indicates the recording date and time that said first feature data has been recorded in said feature database.

16. A moving picture processing apparatus according to claim 12, further comprising:

an outputting section configured to output second picture data for displaying second picture corresponding to said second shot, when it is judged that said first shot is not similar to said second shot.

17. A moving picture processing apparatus according to claim 12, further comprising:

a second creating section configured to create message data for displaying a message that a first picture corresponding to the first shot has already been displayed at least in a part of said second picture, when it is judged that said first shot is similar to said second shot.

18. A moving picture processing apparatus according to claim 12, wherein said moving picture data includes audio data.

19. A moving picture processing apparatus according to claim 12, wherein:

said first feature data includes first average value data that indicates the average value of three primary colors in each pixel-region of said first picture divided into specific pixel regions; and said second feature data includes second average value data that indicates the average value of three primary colors in each pixel region of said second picture divided into specific pixel regions.

20. A moving picture processing apparatus according to claim 12, wherein:

said first feature data includes first luminance data indicating the luminance of said first picture, first color difference data indicating the color difference between the luminance and red, and second color difference data indicating the color difference between the luminance and blue; and said second feature data includes second-luminance data indicating the luminance of said second picture, third color difference data indicating the color difference between the luminance and red, and fourth color difference data indicating the color difference between the luminance and blue.

21. A moving picture processing apparatus according to claim 12, wherein said first feature data includes first luminance data indicating the luminance of said first picture, and said second feature data includes second luminance data indicating the luminance of said second picture.

22. A moving picture processing apparatus according to claim 12, wherein:

said frames selected from the first shot includes a beginning frame, middle frame, and end frame of said first shot, and a frame between the beginning and middle of the shot, and a frame between the middle and end of the shot; and said frames selected from the second shot includes a beginning frame, middle frame, and end frame of said second shot, and a frame between the beginning and middle frames, and a frame between the middle and end frames.

23. A moving picture processing method comprising:

selecting a first shot serving as a comparison reference from inputted moving picture data; including a first picture selecting second shots including a second picture to be compared from the inputted moving picture data;

judging whether or not said first shot is similar to said second shots in sequence based on a first non-contiguous subset of frames in the first and a second non-contiguous subset of frames in the second shots;

putting a first visible label on at least one shot of the second shots, the at least one shot to which it is judged that said first shot is not similar;

judging whether or not one of said second shots is a preset shot; and creating picture data for displaying a screen corresponding to one frame selected from said at least one shot with said first visible label, when it is judged that the one of said second shots is a preset shot.

24. A moving picture processing method according to claim 23, wherein the judging whether or not said first shot is similar to said second shots in sequence, comprises:

extracting second feature data indicating a feature of second frames in one of said second shots; and judging whether or not said first shot is similar to said one of the second shots, based on said second feature data and first feature data indicating a feature of first frames in said first shot.

25. A moving picture processing method according to claim 24, further comprising storing said first feature data in a feature database, when said first shot is not similar to said one of the second shots.

26. A moving picture processing method according to claim 25, wherein said first feature data includes recording data that indicates the recording date and time that said first feature data has been recorded in said feature database.

27. A moving picture processing method according to claim 24, wherein:

said first feature data includes first average value data that indicates the average value of three primary colors in each pixel region of said first picture divided into specific pixel regions; and said second feature data includes second average value data that indicates the average value of three primary colors in each pixel region of said second picture divided into specific pixel regions.

28. A moving picture processing method according to claim 24, wherein:

said first feature data includes-first luminance data indicating the luminance-of said first picture, first color difference data indicating the color difference between the luminance and red, and second color difference data indicating the color difference between the luminance and blue; and said second feature data includes second luminance data indicating the luminance of said second picture, third color difference data indicating the color difference between the luminance and red, and fourth color difference data indicating the color difference between the luminance and blue.

29. A moving picture processing method according to claim 24, wherein said first feature data includes first luminance data indicating the luminance of said first picture, and said second feature data includes second luminance data indicating the luminance of said second picture.

30. A moving picture processing method according to claim 24, wherein:

the first subset includes a beginning frame, middle frame, and end frame of said first shot, and a frame between the beginning and middle frames, and a frame between the middle and end frames; and the second subset includes a beginning frame, middle frame, and end frame of said second shot, and a frame between the beginning and middle frames, and a frame between the middle and end frames.

31. A moving picture processing method according to claim 23, wherein said moving picture data includes audio data.

32. A moving picture processing method comprising:

a first step of selecting a first shot serving as a comparison reference from inputted moving picture data; including a first picture a second step of selecting a shot next to said first shot as a second shot to be compared from the inputted moving picture data; including a second picture a third step of judging whether or not said first shot is similar to said second shot;

a fourth step of putting first label on said second shot, when it is judged that the first shot is not similar to said second shot;

a sixth step of judging whether or not said second shot is a preset shot;

a fifth step of determining a shot next to said second shot to be a new second shot, when it is judged that the second shot is not a preset shot, and then executing said third step to said fifth step repeatedly;

a seventh step of judging whether or not a specified number of shots have been made said first shot, when it is judged that a second shot is a preset shot;

an eighth step of determining a shot next to said first shot to be a new first shot, when a specific number of shots have not been made said first shot, and then executing said third step to said seventh step repeatedly; and a ninth step of creating image data for displaying a screen corresponding to one frame selected from the second shot with said first label, when it is judged that a specific number of shots have been made said first visible shot, wherein the third step includes the steps of:

selecting frames from the first shot and frames from the second shot;

extracting first feature data from said frames selected from the first shot and second feature data from the frames selected from the second shot wherein the first feature data indicate features of said frames selected from the first shot and the second feature data indicate feature of the frames selected from the second shot, respectively;

comparing the first feature data and the second feature data with each other in order to obtain a similarity between the first feature data and second feature data; and judging, based on the obtained similarity between the first feature data and the second feature data, whether or not said first shot is similar to said second shot.

33. A moving picture processing method according to claim 32, wherein the third step of judging whether or not said first shot is similar to said second shot, comprises:

extracting second feature data indicating a feature of frames in said second subset; and judging whether or not said first shot is similar to said second shot, based on said second feature data and first feature data indicating a feature of frames in said first subset.

34. A moving picture processing method according to claim 33, further comprising storing said first feature data in a feature database, when it is judged that said first shot is not similar to said second shot.

35. A moving picture processing method according to claim 34, wherein said first feature data includes first luminance data indicating the luminance of said first picture, and said second feature data includes second luminance data indicating the luminance of said second picture.

36. A moving picture processing method according to claim 33, wherein:

said first feature data includes first average value data that indicates the average value of the three primary colors in each pixel region of said first picture divided into specific pixel regions; and said second feature data includes second average value data that indicates the average value of the three primary colors in each pixel region of said second picture divided into specific pixel regions.

37. A moving picture processing method according to claim 33, wherein:

said first feature data includes first luminance data indicating the luminance of said first picture, first color difference data indicating the color difference between the luminance and red, and second color difference data indicating the color difference between the luminance and blue; and said second feature data includes second luminance data indicating the luminance of said second picture, third color difference data indicating the color difference between the luminance and red, and fourth color difference data indicating the color difference between the luminance and blue.

38. A moving picture processing method according to claim 33, wherein:

the first subset includes a beginning frame, middle frame, and end frame of said first shot, and a frame between the beginning and middle frames, and a frame between the middle and end frames; and the second subset includes a beginning frame, middle frame, and end frame of said second shot, and a frame between the beginning and middle frames, and a frame between the middle and end frames.

39. A moving picture processing method according to claim 32, wherein said moving picture data includes audio data.

40. A moving picture processing method according to claim 39, wherein said first feature data includes recording data that indicates the recording date and time that said first feature data has been recorded in said feature database.

41. A moving picture processing apparatus comprising:

a first selecting section configured to select a first shot serving as a comparison reference from inputted moving picture data; including a first picture a second selecting section configured to select second shots to be compared from the inputted moving picture data; including a second picture a first judging section configured to judge whether or not said first shot is similar to said second shots in sequence based on a first non-contiguous subset of frames in the first and a second non-contiguous subset of frames in the second shots;

a labeling section configured to put a first visible label on at least one shot of the second shots, the at least one shot to which it is judged that first shot is not similar;

a second judging section configured to judge whether or not one of said second shots is a preset shot; and a creating section configured to create image data for displaying a screen corresponding to one frame selected from said at least one shot with said first visible label, when it is judged that one of said second shots is a preset shot.

42. A moving picture processing apparatus according to claim 41, wherein said first judging means comprises:

an extracting section configured to extract second feature data indicating a feature of second frames in one of said second shots; and a third judging section configured to judge whether or not said first shot is similar to said one of the second shots, based on said second feature data and first feature data indicating a feature of first frames in said first shot.

43. A moving picture processing apparatus according to claim 42, further comprising a storage section configured to store said first feature data in a feature database, when it is judged that said first shot is not similar to said one of the second shots.

44. A moving picture processing apparatus according to claim 43, wherein said first feature data includes recording data that indicates the recording date and time that said first feature data has been recorded in said feature database.

45. A moving picture processing apparatus according to claim 42, wherein:

said first feature data includes first average value data that indicates the average value of three primary colors in each pixel region of said first picture divided into specific pixel regions; and said second feature data includes second average value data that indicates the average value of the three primary colors in each pixel region of said second picture divided into specific pixel regions.

46. A moving picture processing apparatus according to claim 42, wherein:

said first feature data includes first luminance data indicating the luminance of said first picture, first color difference data indicating the color difference between the luminance and red, and second color difference data indicating the color difference between the luminance and blue; and said second feature data includes second luminance data indicating the luminance of said second picture, third color difference data indicating the color difference between the luminance and red, and fourth color difference data indicating the color difference between the luminance and blue.

47. A moving picture processing apparatus according to claim 42, wherein said first feature data includes first luminance data indicating the luminance of said first picture, and said second feature data includes second luminance data indicating the luminance of said second picture.

48. A moving picture processing apparatus according to claim 42, wherein:

the first subset includes a beginning frame, a middle frame, and end frame of said first shot, and a frame between the beginning and middle frames, and a frame between the middle and end frames; and the second subset includes a beginning frame, middle frame, and end frame of said second shot, and a frame between the beginning and middle frames, and a frame between the middle and end frames.

49. A moving picture processing apparatus according to claim 41, wherein said moving picture data includes audio data.

50. A computer program product for operating a computer, said computer product comprising:

a computer readable medium;

first program instruction means for instructing a computer processor to select a first non-contiguous subset of frames from a first shot of inputted moving picture data;

second program instruction means for instructing a computer processor to extract first feature data from each of the frames in the first subset of frames selected; and third program instruction means for instructing a computer processor to judge, based on said first feature data and second feature data indicating features of frames selected from a second non-contiguous subset of frames of a second shot of said moving picture data inputted before said first shot, whether or not said first shot is similar to said second shot, wherein each of said program instruction means is recorded on said medium in executable form and is loadable into the computer for execution by the processor.

51. A computer program product for operating a computer, said computer product comprising:

a computer readable medium;

first program instruction means for instructing a computer processor to select a first non-contiguous subset of a first shot serving as a comparison reference from inputted moving picture data;

second program instruction means for instructing a computer processor to select a second non-contiguous subset of second shots to be compared from the inputted moving picture data;

third program instruction means for instructing a computer processor to judge whether or not said first shot is similar to said second shots in sequence based only on frames of the first and second subsets;

fourth program instruction means for instructing a computer processor to put a first visible label on at least one shot of the second shots, the at least one shot to which it is judged that said first shot is not similar;

fifth program instruction means for instructing a computer processor to judge whether or not one of said second shots is a preset shot; and sixth program instruction means for instructing a computer processor to create picture data for displaying a screen corresponding to one frame selected from said at least one shot within said first label, when it is judged that the one of said second shots is a preset shot, wherein each of said program instruction means is recorded on said medium in executable form and is loadable into the computer for executing by the processor.

* * * * *